US010794767B1

(12) United States Patent
Acker

(10) Patent No.: US 10,794,767 B1
(45) Date of Patent: Oct. 6, 2020

(54) POLARIZATION DECORRELATION TIME IMAGING

(71) Applicant: BAE Systems Information and Electronic Systems Integration Inc., Nashua, NH (US)

(72) Inventor: Andrew N. Acker, Honolulu, HI (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/518,571

(22) Filed: Jul. 22, 2019

(51) Int. Cl.
*G01J 4/02* (2006.01)
*G06K 9/00* (2006.01)
*G06K 9/46* (2006.01)
*H01S 3/13* (2006.01)
*G01J 4/00* (2006.01)

(52) U.S. Cl.
CPC ............ *G01J 4/02* (2013.01); *G06K 9/00637* (2013.01); *G06K 9/46* (2013.01); *G01J 2004/004* (2013.01); *H01S 3/1308* (2013.01)

(58) Field of Classification Search
CPC .. G01J 4/02; G01J 2004/004; G06K 9/00637; G06K 9/46; H01S 3/1308
USPC ......................................................... 356/364
See application file for complete search history.

(56) References Cited

U.S. PATENT DOCUMENTS

| | | | | |
|---|---|---|---|---|
| 4,323,898 A * | 4/1982 | Barnes | ..................... | G01S 7/024 342/188 |
| 6,522,407 B2 * | 2/2003 | Everett | ................ | A61B 5/0073 356/364 |
| 9,001,326 B2 * | 4/2015 | Goldfain | ............... | A61B 5/0075 356/368 |
| 9,086,501 B2 * | 7/2015 | Beer | ........................ | G01S 7/295 |
| 9,519,055 B2 * | 12/2016 | Hellsten | .................. | G01S 13/90 |
| 9,671,521 B2 | 6/2017 | Louchard | | |
| 10,048,229 B2 | 8/2018 | Turner et al. | | |
| 10,234,559 B2 * | 3/2019 | Misra | ..................... | G01S 7/4816 |
| 10,416,303 B2 * | 9/2019 | Hellsten | ................ | G01S 13/904 |
| 10,620,051 B2 * | 4/2020 | Acker | ...................... | G01V 3/12 |

(Continued)

OTHER PUBLICATIONS

Heinrich M. Jaeger, et al., Granular Solids, Liquids, and Gases, Reviews of Modern Physics, Oct. 1996, pp. 1259-1273, vol. 68, No. 4.

(Continued)

*Primary Examiner* — Roy M Punnoose
(74) *Attorney, Agent, or Firm* — Sand, Sebolt & Wernow LPA

(57) ABSTRACT

An object detection system uses a change in a linear polarization statistic between a first image at a first time and a second image at a second time to determine the presence or the likelihood of an object beneath a surface. The presence of the object may be determined by regions of anomalously high changes in the polarization statistic. The system may use a polarization change detection detector which may simultaneously capture images in multiple polarization channels. Further, the polarization change detection detector may be coupled with a laser interferometry system. Further, the polarization change detection detector may be used to capture a time series of images to determine the polarization decorrelation time for each pixel in the field of view to provide additional detail regarding an object detected beneath the surface.

20 Claims, 15 Drawing Sheets

(56) References Cited

U.S. PATENT DOCUMENTS

2005/0128125 A1* 6/2005 Li .................... G01V 3/12
342/22
2012/0059254 A1* 3/2012 Lifan .................. G01J 3/0229
600/431

OTHER PUBLICATIONS

Jennifer Kreft, et al., Fluidization of a Vertically Oscillated Shallow Granular Layer, arXiv:070433852v2, Aug. 1, 2007, 6 Pages.
Thorsten Poschel, et al., Onset of Fluidization in Vertically Shaken Granular Material, arXiv:cond-mat/9711234v2, Dec. 16, 1999, pp. 1-7.
Ning Xiang, et al., An Experimental Study on Antipersonnel Landmine Detection Using Acoustic-to-Seismic Coupling, J. Acoust. Soc. Am. 113 (3), Mar. 2003, pp. 1333-1341.
Victor V. Krylov, Detection of Buried Land Mines Using Scattering of Rayleigh Waves, Conference: 27th International Conference on Noise and Vibration Engineering (ISMA 2016), Sep. 2016, 9 Pgs., Leuven, Belgium, https://dspace.lboro.ac.uk/2134/22819.

* cited by examiner

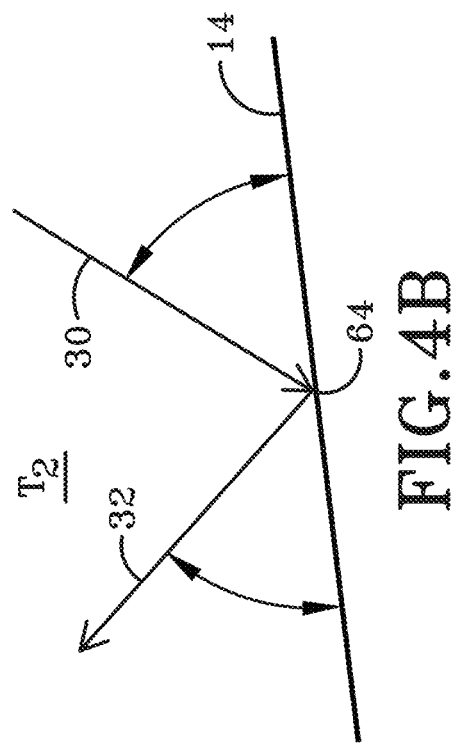
FIG.4A
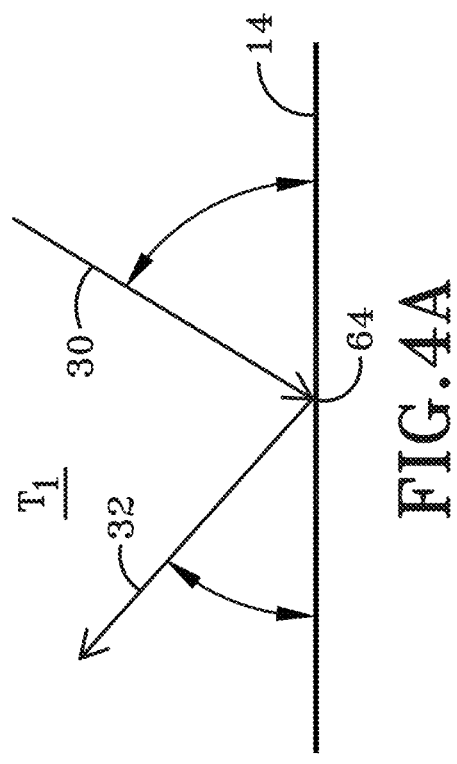
FIG.4B
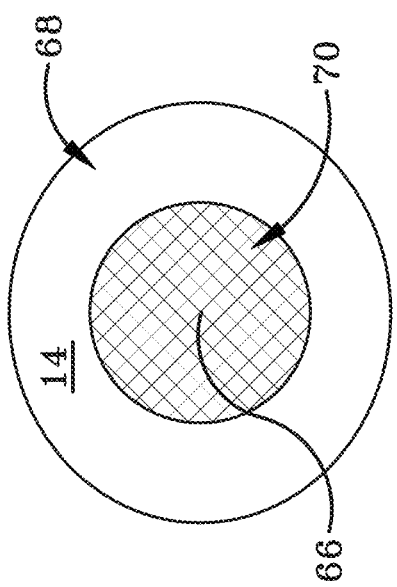
FIG.5C
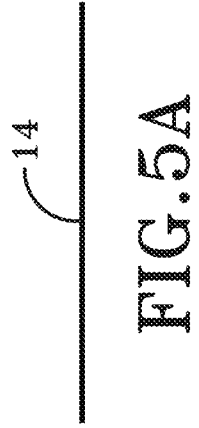
FIG.5B
FIG.5A

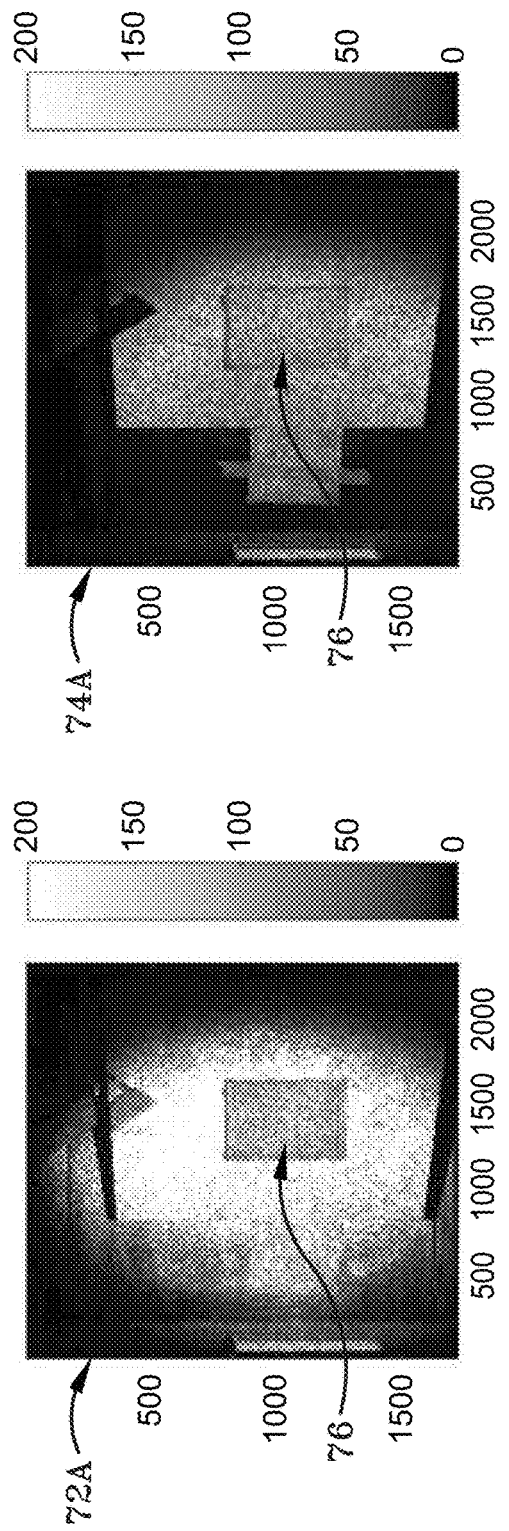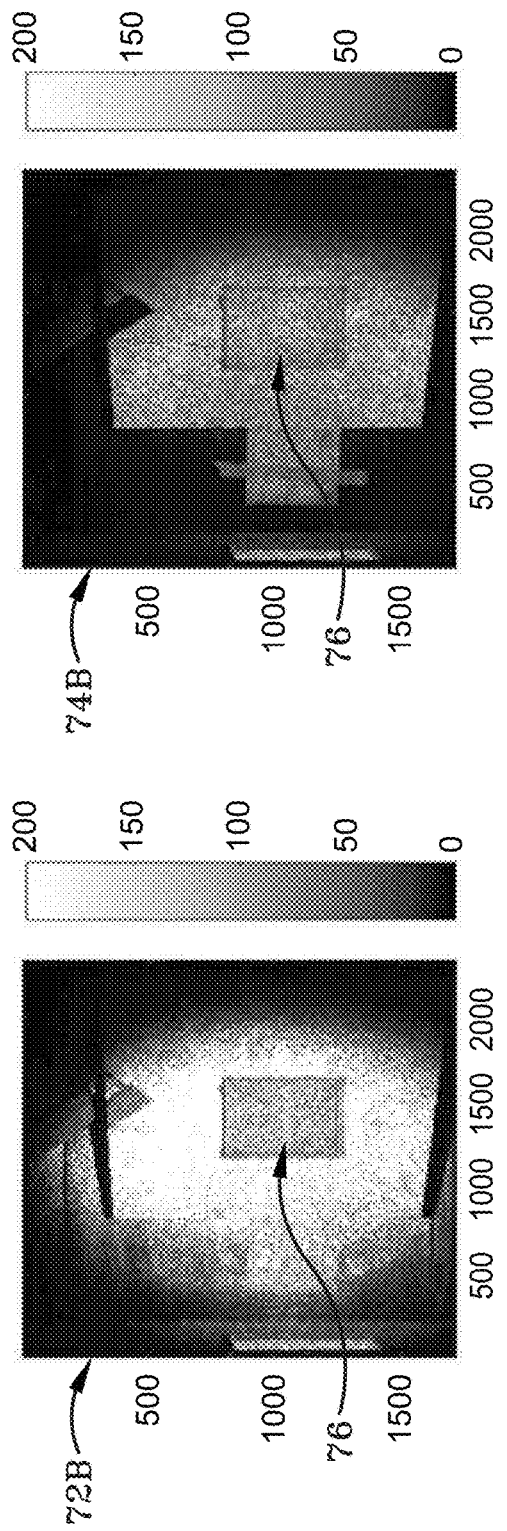

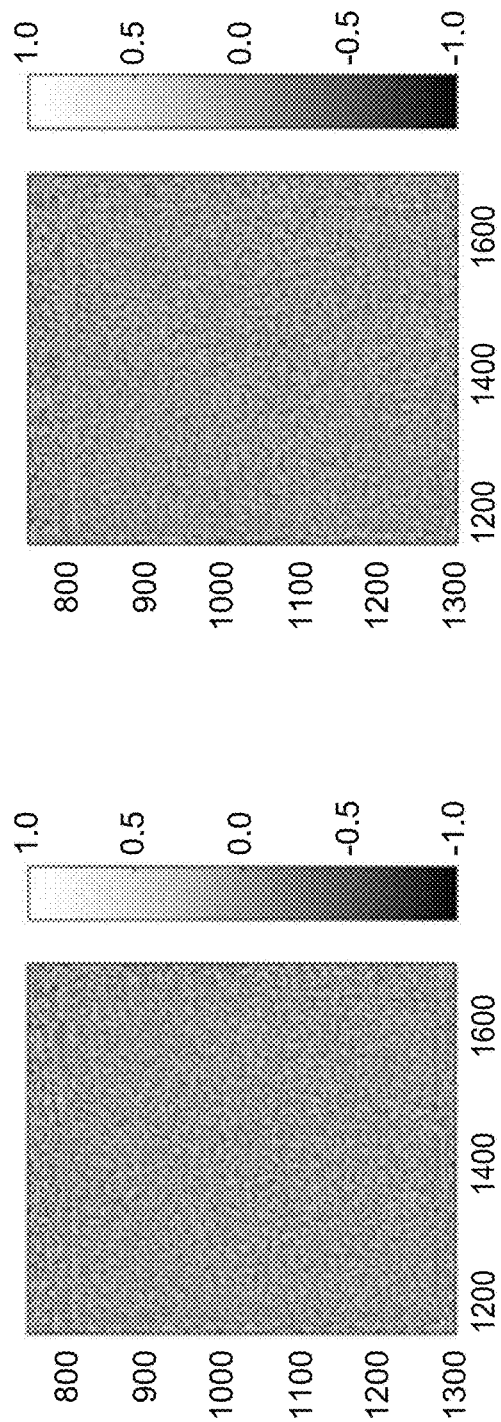
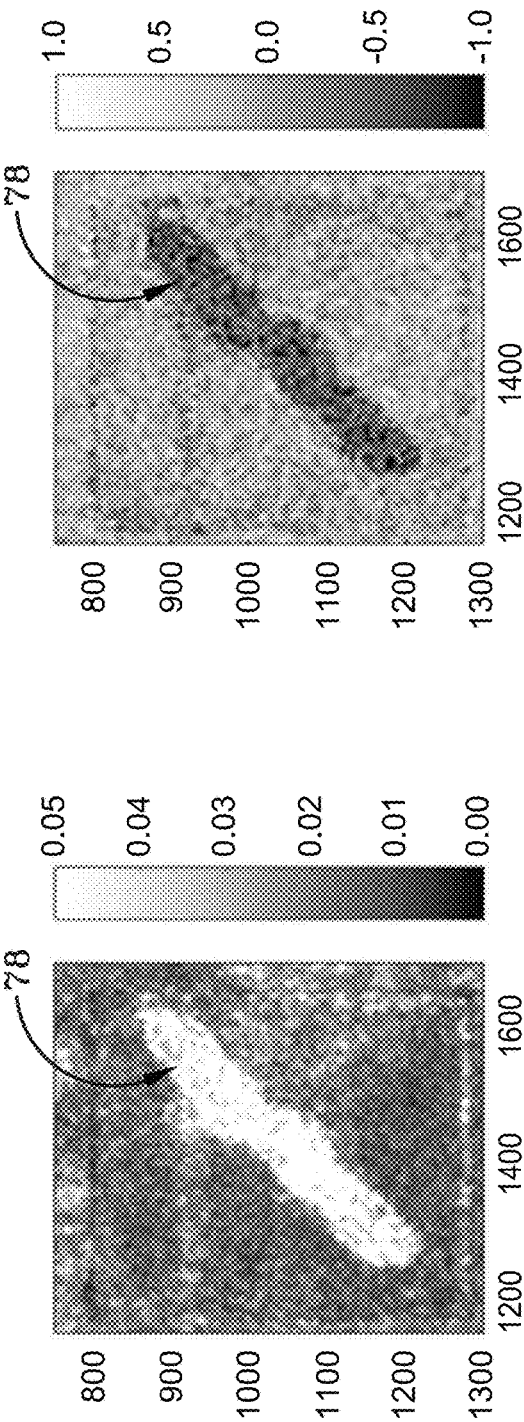
FIG. 9A  FIG. 9B  FIG. 10A  FIG. 10B

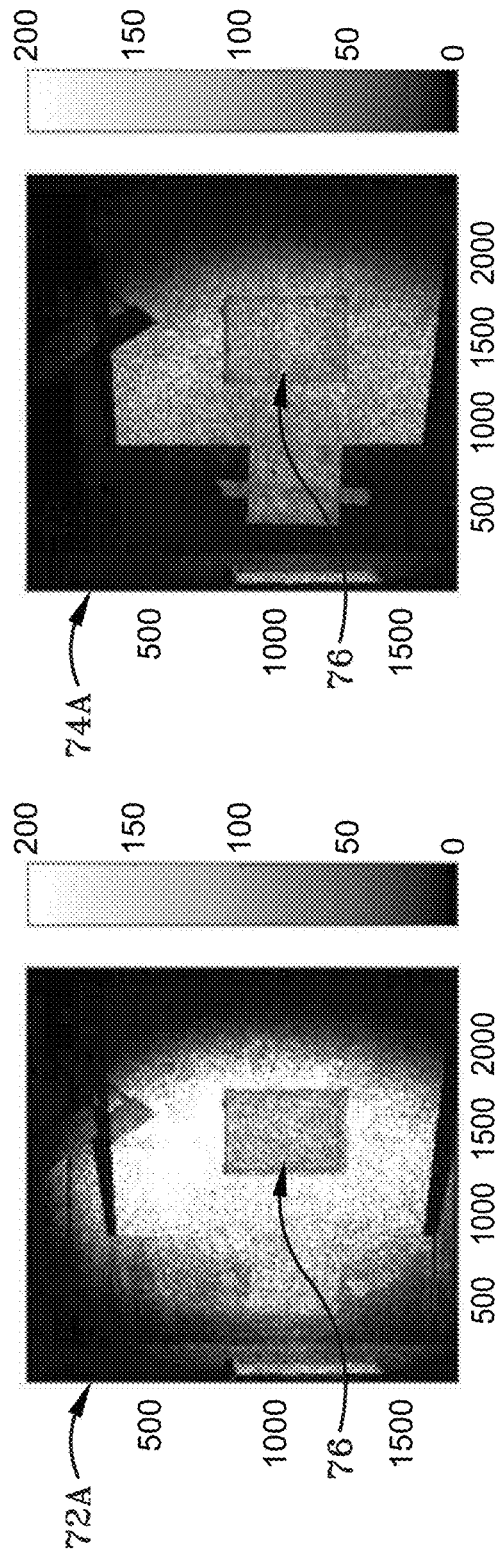
FIG. 11A
FIG. 11B
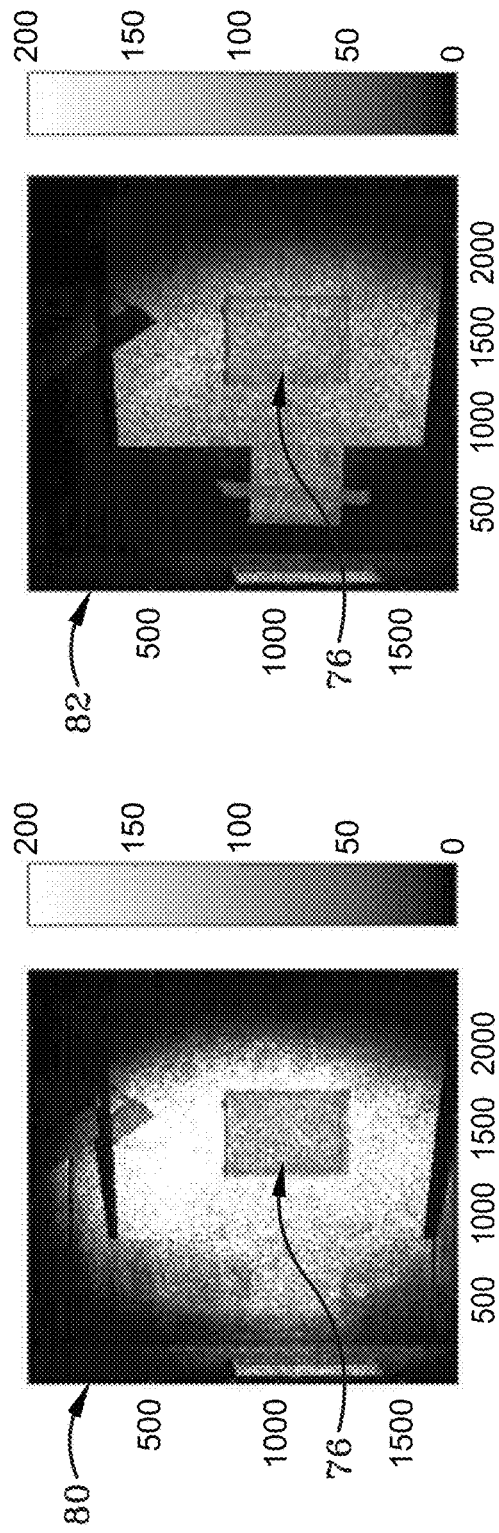
FIG. 12A
FIG. 12B

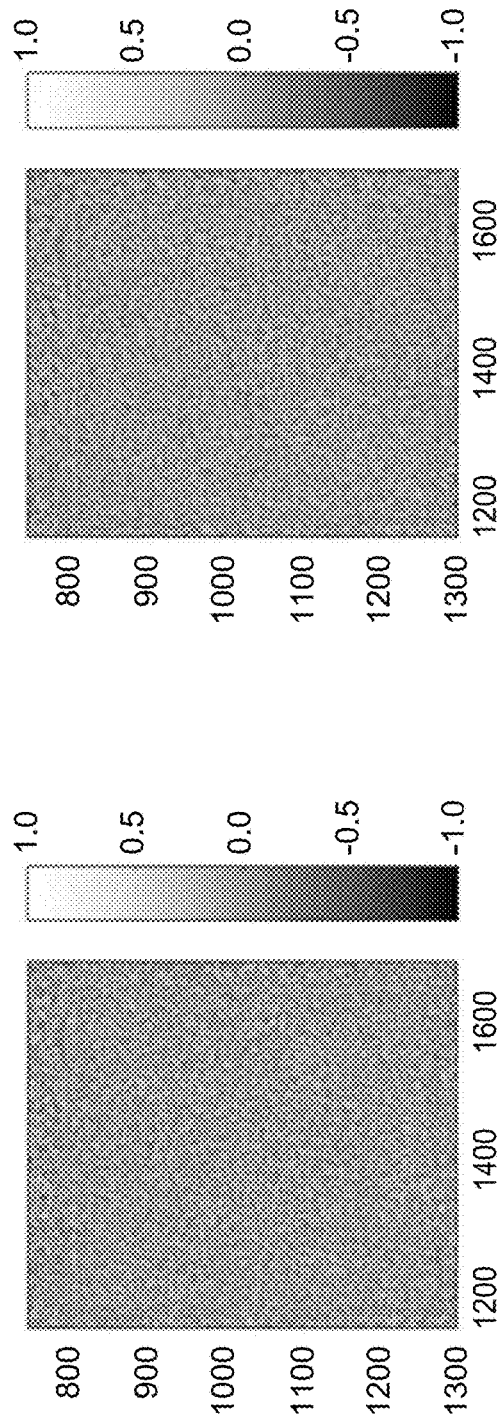
FIG. 13A
FIG. 13B
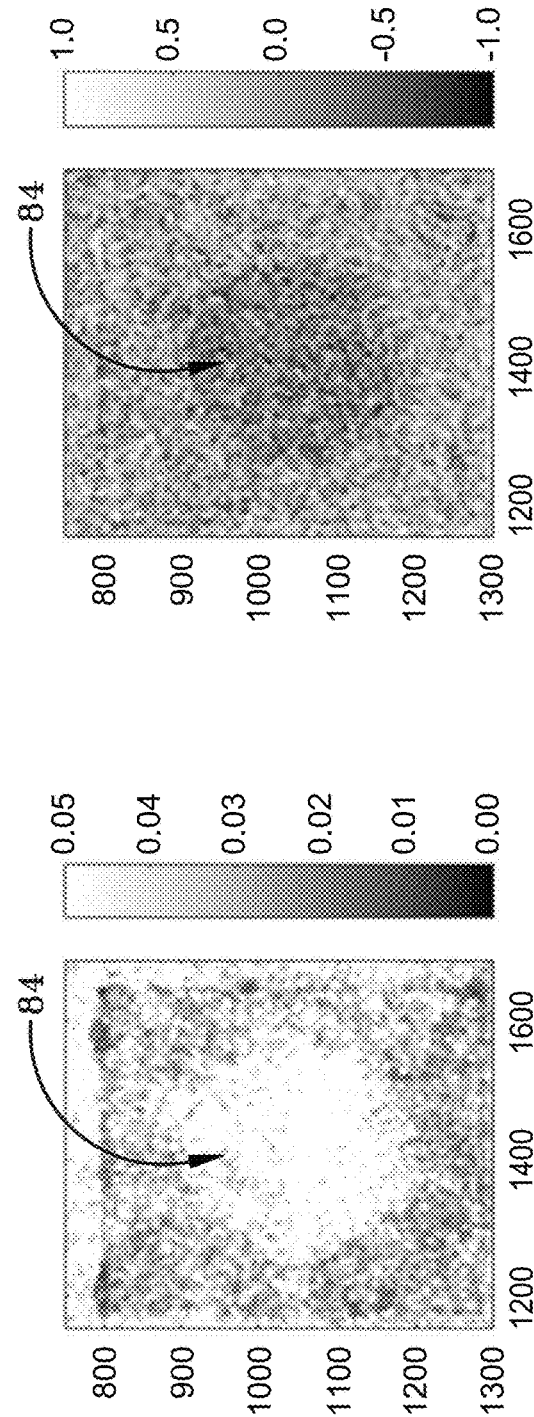
FIG. 14A
FIG. 14B

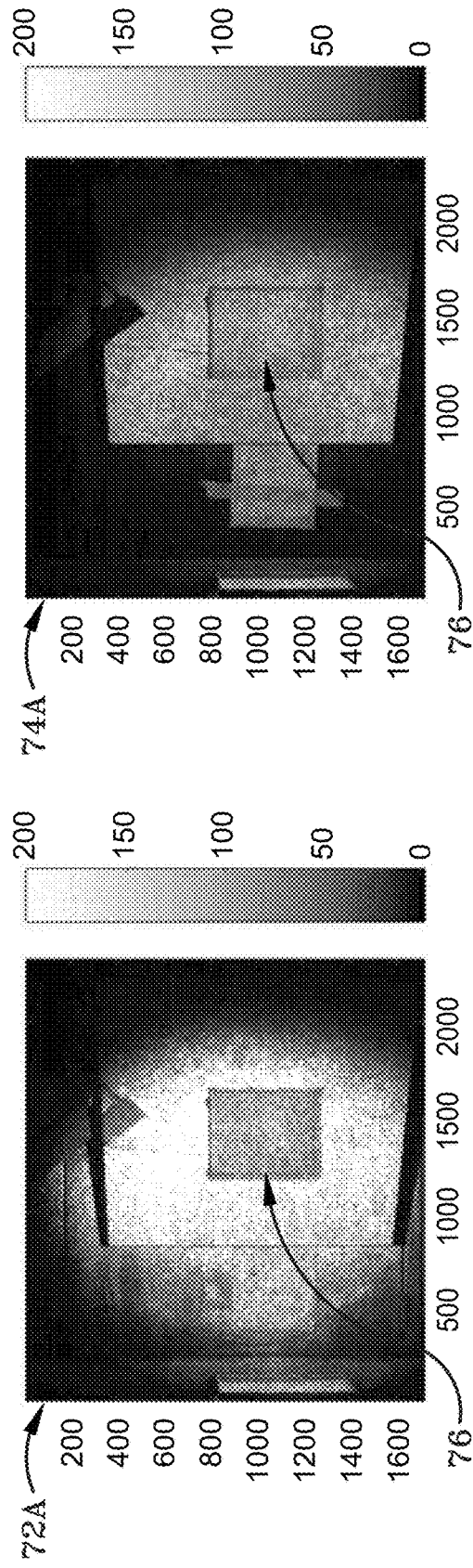
FIG. 15A
FIG. 15B
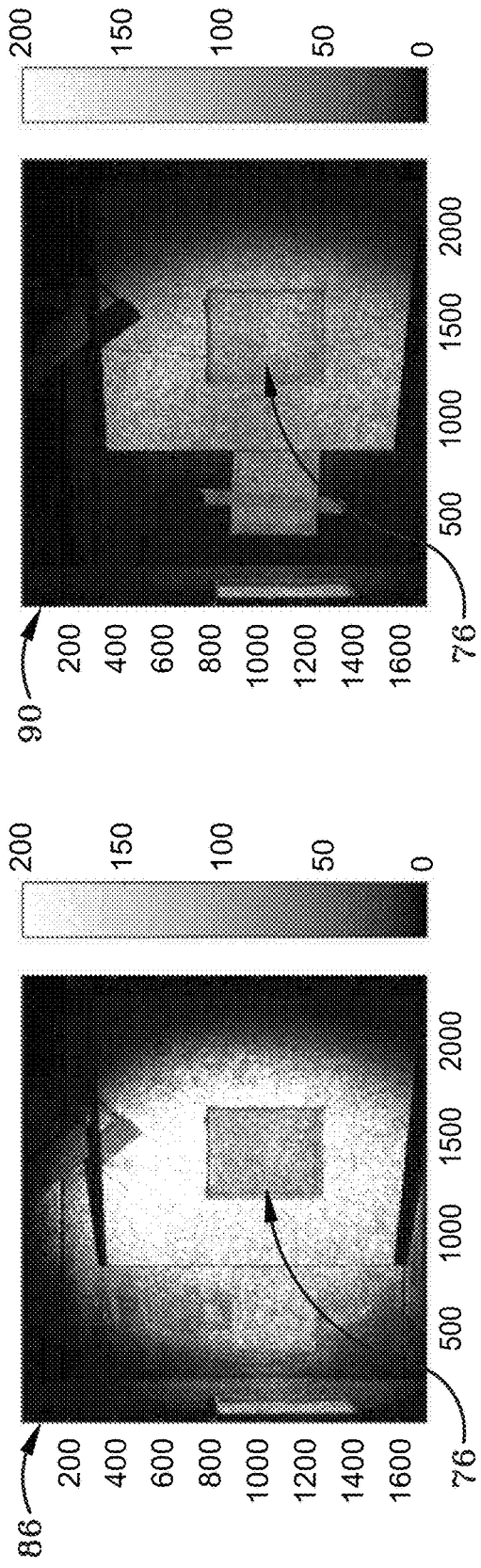
FIG. 16A
FIG. 16B

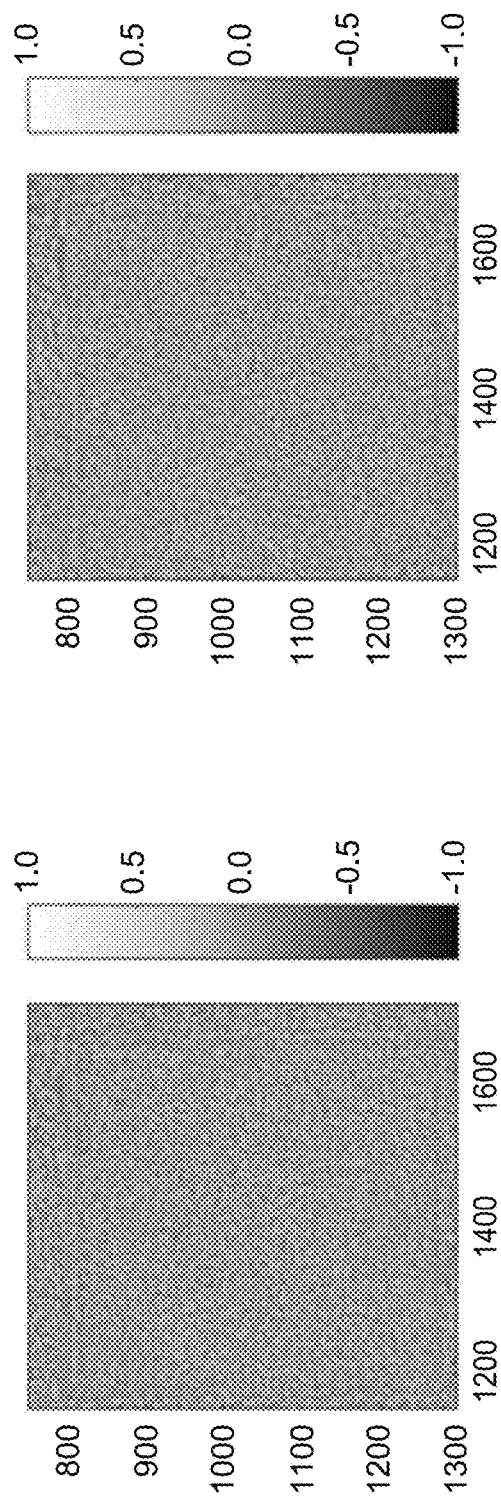
FIG. 17A
FIG. 17B
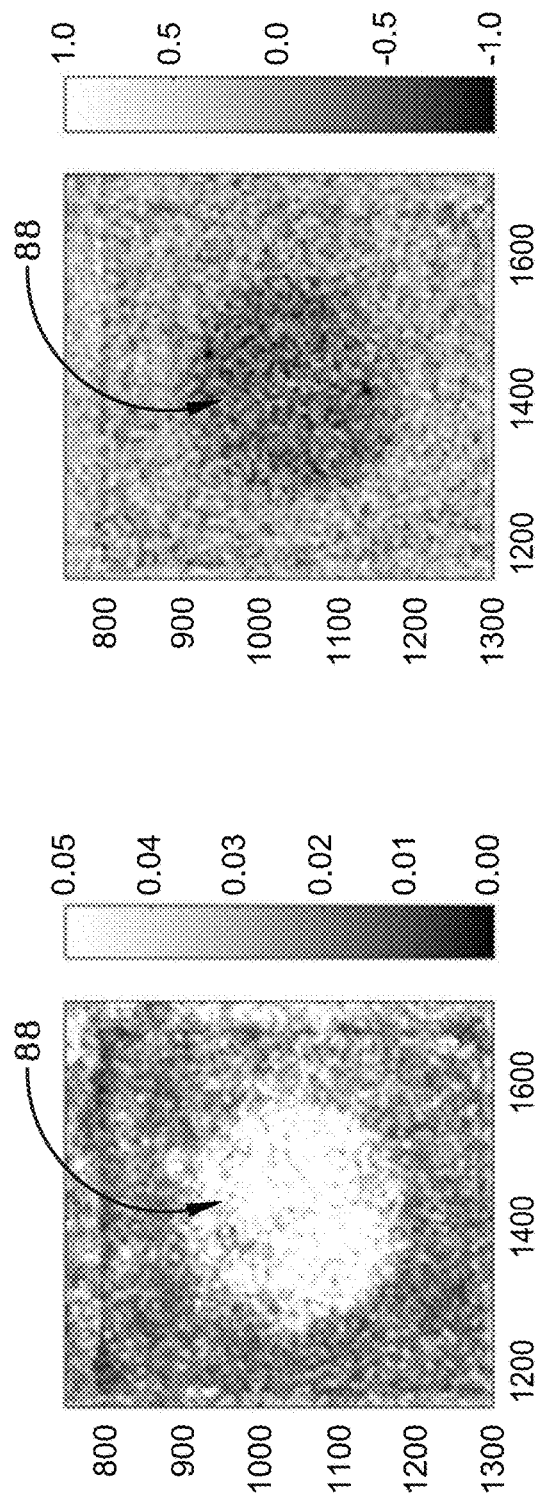
FIG. 18A
FIG. 18B

POLARIZATION DECORRELATION TIME IMAGING

TECHNICAL FIELD

The present disclosure relates generally to the detection of sub-surface or subterranean objects. More particularly, the present disclosure relates to the detection of sub-surface objects through the use of imagery analysis. Specifically, the present disclosure relates to the detection of sub-surface objects with a polarization change detection detector that analyzes polarization changes in reflected light over image pairs at collected at different times.

BACKGROUND

Background Information

Linear polarization of electromagnetic radiation is a confinement of the electric field vector or magnetic field vector to a given plane along the direction of propagation. Generally, the polarization state of an electromagnetic wave is defined by the direction of the electric field vector. For example, if the electric field vector is vertical (alternately up and down as the wave travels) the radiation is said to be vertically polarized.

More generally, linear polarization is a special case of elliptical polarization. In elliptical polarization, the tip of the electric field vector varies in time, tracing an ellipse in the plane normal to the light propagation direction. The total electromagnetic field can be resolved into a superposition of two linearly-polarized waves with their electric fields at right angles to each other, defining the major axis and minor axis of the ellipse. Linear polarization is a special case of elliptical polarization, in which the minor axis approaches zero length. Similarly, circular polarization is a special case in which the minor axis equals the major axis. In addition to the ratio of minor to major axis lengths, and the orientation of the major axis, elliptical polarization is characterized by the rotation direction of the electric field along the polarization ellipse. The field may rotate either right-handedly or left-handedly with respect to the direction of propagation. In technical discussions, this handedness is also called chirality. Thus, there are two circular directions of circular polarization, distinguished by chirality. Elliptical polarization states are further distinguished by the ratio of major to minor axes, and by the direction of the major axis, in addition to the chirality.

Generally, a degree of linear polarization (DOLP) is a quantity used to describe the ratio of intensity of the linearly polarized component of an electromagnetic wave (such as a laser beam) to the total intensity thereof. A perfectly linearly polarized wave has a DOLP of 100%, whereas an unpolarized wave has a DOLP of 0%. A wave which is partially polarized, and therefore can be represented by a superposition of a polarized and unpolarized component, will have a DOLP somewhere in between 0 and 100%. DOLP is calculated as the fraction of the total power that is carried by the polarized component of the wave. DOLP can be used to distinguish circularly-polarized chirality, by using optical components known as quarter-wave plates (QWPs) to convert circular polarization to linear polarization. This enables a detector in which a DOLP measures the degree of circular polarization (DOCP). The process may be further generalized to discriminate different elliptical polarization states via combinations of beam splitters, linear polarizers, and wave plates. Similarly, elliptical polarization may be resolved into a combination of linear components by using a combination of wave plates and beam splitters, and DOLP can be computed for those linear components. Thus, DOLP can be made sensitive to changes in linear, circular, or elliptical polarization.

Typically, DOLP is only used as a statistic to quantify the intensity ratio of the polarized electromagnetic wave and DOLP is not used to generate additional signals, such as an alert signal in a subsurface or subterranean object detection system.

SUMMARY

Heretofore, detection systems have not taken advantage of DOLP as a measurement that can further supplement the ability of the detections systems to detect a subsurface or subterranean object or track an object moving along the surface. The present disclosure addresses these and other issues by taking advantage of DOLP, and more particularly in one embodiment ΔDOLP in image pairs, to supplement subsurface object detection systems and other object tracking systems or standalone detection systems. However, other embodiments may use any statistic S that measures the change in the degree or direction of the polarization of the return signal could be used. In another embodiment, the present disclosure may take advantage of ΔDOLP over a series of time images to determine the time at which each pixel within an imaged region decorrelates below a predetermined threshold in a process referred to as polarization decorrelation time imaging (PDTI).

In one aspect, an exemplary embodiment of the present disclosure may provide a system for detecting an object below a surface, the system comprising: a polarization change detection (PCD) detector that captures a first image of the surface at a first time ($T_1$) and a plurality of subsequent images of the surface at a plurality of subsequent second times ($T_N$); and a processor in operative communication with the PCD detector to determine a degree of linear polarization (DOLP) of the first image at $T_1$ and a DOLP of each of the subsequent images at times $T_N$, wherein the surface changes continuously from $T_1$ to each subsequent time $T_N$ and the processor determines a statistic associated with the DOLP relative to a particular time each image of the plurality of subsequent images was taken. This exemplary embodiment or another exemplary embodiment may further provide wherein the PCD detector comprises: logic operative to convert different circular or elliptical polarization states into linear polarization states distinguishable by DOLP. This exemplary embodiment or another exemplary embodiment may further provide wherein the PCD detector comprises: an imager having a first portion further defining a co-polarization channel and a second portion further defining a cross-polarization channel. This exemplary embodiment or another exemplary embodiment may further provide wherein the first portion and second portion of the imager are contained within a single unit. This exemplary embodiment or another exemplary embodiment may further provide wherein the statistic associated with the DOLP is a correlation coefficient for each pixel from a plurality of pixels within the imager; and wherein the processor assigns a decorrelation time ($T_{DC}$) for each pixel from the plurality of pixels within the imager corresponding to the specific time the correlation coefficient is equal to or less than a predetermined threshold. This exemplary embodiment or another exemplary embodiment may further provide wherein the processor generates a polarization decorrelation time imaging (PDTI) image and a pixel map from the assigned $T_{DC}$ of each pixel from the plurality of pixels within the imager. This exemplary embodiment or another exemplary embodiment may further provide a polarized light source coupled with the PCD detector to illuminate the surface with polarized electromagnetic radiation. This exemplary embodiment or another exemplary embodiment may further provide wherein the polarized light source comprises: a laser transmitter generating a polarized laser beam directed at the surface, wherein the first image and the subsequent images capture a reflected beam from the surface. This exemplary embodiment or another exemplary embodiment may further provide a laser interferometric sensor (LIS) system comprising a laser transmitter coupled with the PCD detector. This exemplary embodiment or another exemplary embodiment may further provide wherein the laser transmitter is part of the LIS system and generates a polarized laser beam. This exemplary embodiment or another exemplary embodiment may further provide a platform carrying the LIS system and the PCD detector. This exemplary embodiment or another exemplary embodiment may further provide an acoustic modulator generating an acoustic wave to agitate the subsurface object.

In another aspect, an exemplary embodiment of the present disclosure may provide a subsurface object detection method comprising: illuminating a surface with polarized electromagnetic waves; capturing, with a polarization change detection (PCD) detector, a first image of the surface at a first time ($T_1$); determining a degree of linear polarization (DOLP) for each pixel within a field of view of the PCD detector in the first image from polarized reflected light from the surface; capturing, with the PCD detector, a series of images taken at subsequent times ($T_N$); determining the DOLP for each pixel within the field of view of the PCD detector in each of the series of subsequent images from polarized reflected light from the surface; comparing, by the processor, each pixel in each of the subsequent images taken at each of times ($T_N$) to the same pixel in the first image of the surface taken at time ($T_1$); determining, by the processor, the time at which each pixel decorrelates below a predetermined threshold (p Threshold) relative to the first image of the surface 14 taken at time ($T_1$); and generating, by the processor, a pixel map and polarization decorrelation time imaging (PDTI) image. This exemplary embodiment or another exemplary embodiment may further provide converting different circular or elliptical polarization states into linear polarization states distinguishable by DOLP. This exemplary embodiment or another exemplary embodiment may further provide changing the surface continuously between $T_1$ and $T_N$, wherein the DOLP of each pixel is responsive to changing the surface between $T_1$ and $T_N$. This exemplary embodiment or another exemplary embodiment may further provide determining at least one of a size, shape, depth, and composition of an object buried under the surface from the pixel map and PDTI image. This exemplary embodiment or another exemplary embodiment may further provide modulating an acoustic modulator to direct sound waves towards the surface simultaneous to illuminating the surface with polarized electromagnetic waves. This exemplary embodiment or another exemplary embodiment may further provide wherein determining the time at which each pixel decorrelates below $\rho_{Threshold}$ further comprises: determining, by the processor, the change in DOLP (ΔDOLP) for each pixel in each of the images taken at each subsequent time relative to the same pixel in the image taken at time $T_1$; calculating a correlation coefficient for each pixel in each of the images taken at each subsequent time relative to the same pixel in the image taken at time $T_1$; and comparing the correlation coefficient to the $\rho_{Threshold}$. This exemplary embodiment or another exemplary embodiment may further provide wherein capturing, with the PCD detector, a series of images taken at subsequent times ($T_N$) further comprises: capturing a series of images at a preset interval for a predetermined time period. This exemplary embodiment or another exemplary embodiment may further provide wherein capturing, with the PCD detector, a series of images taken at subsequent times ($T_N$) further comprises: capturing a first portion of the series of images at a first interval during a first time period; and capturing a second portion of the series of images at a second interval during a second time period.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

FIG. 4A is a diagrammatic section view of the surface at a first time.

FIG. 4B is a diagrammatic section view of the surface at a subsequent second time after the surface has tilted or otherwise shifted.

FIG. 5A is a diagrammatic section view of the surface at a first time.

FIG. 5B is a diagrammatic section view of the surface at a subsequent second time after the surface has varied to change its vertical height, wherein FIG. 5B represents an increase in height forming a bump, however a similar result of object detection would be achieved with a decrease in height forming a depression.

FIG. 5C is a diagrammatic representation of a top view of a merged image that would result from combining (i.e., merging) a first top plan view image of the surface of FIG. 5A with the second top plan view image of the surface of FIG. 5B and further depicts the change in the surface between the first time and a subsequent second time.

FIG. 7A is an image from a first test simulation of a detection region at a first time in a co-polarization channel.

FIG. 7B is an image from the first test simulation of the detection region at the first time in a cross-polarization channel.

FIG. 8A is an image from the first test simulation of the detection region at a subsequent second time in the co-polarization channel.

FIG. 8B is an image from the first test simulation of the detection region at the subsequent second time in the cross-polarization channel.

FIG. 9A is a high pass filtered image depicting a degree of linear polarization (DOLP) from the first test simulation of the detection region from the first time.

FIG. 9B is a high pass filtered image depicting the DOLP from the first test simulation of the detection region from the second time.

FIG. 10A is an image depicting the change in DOLP (ΔDOLP) from the first test simulation of the detection region from the first time to the second time.

FIG. 10B is an image depicting the DOLP ratio $$\left(\frac{DOLP2}{DOLP1}\right)$$

from the first test simulation of the detection region from the first time to the second time.

FIG. 11A is an image from a second test simulation of a detection region at a first time in a co-polarization channel.

FIG. 11B is an image from the second test simulation of the detection region at the first time in a cross-polarization channel.

FIG. 12A is an image from the second test simulation of the detection region at a subsequent second time in the co-polarization channel.

FIG. 12B is an image from the second test simulation of the detection region at the subsequent second time in the cross-polarization channel.

FIG. 13A is a high pass filtered image depicting the DOLP from the second test simulation of the detection region from the first time.

FIG. 13B is a high pass filtered image depicting the DOLP from the second test simulation of the detection region from the second time.

FIG. 14A is an image depicting ΔDOLP from the second test simulation of the detection region from the first time to the second time.

FIG. 14B is an image depicting the DOLP ratio $$\left(\frac{DOLP2}{DOLP1}\right)$$

from the second test simulation of the detection region from the first time to the second time.

FIG. 15A is an image from a third test simulation of a detection region at a first time in a co-polarization channel.

FIG. 15B is an image from the third test simulation of the detection region at the first time in a cross-polarization channel.

FIG. 16A is an image from the third test simulation of the detection region at a subsequent second time in the co-polarization channel.

FIG. 16B is an image from the third test simulation of the detection region at the subsequent second time in the cross-polarization channel.

FIG. 17A is a high pass filtered image depicting the DOLP from the third test simulation of the detection region at the first time.

FIG. 17B is a high pass filtered image depicting the DOLP from the third test simulation of the detection region from the second time.

FIG. 18A is an image depicting ΔDOLP from the third test simulation of the detection region from the first time to the second time.

FIG. 18B is an image depicting the DOLP ratio $$\left(\frac{DOLP2}{DOLP1}\right)$$

from the third test simulation of the detection region from the first time to the second time.

Figure 19:
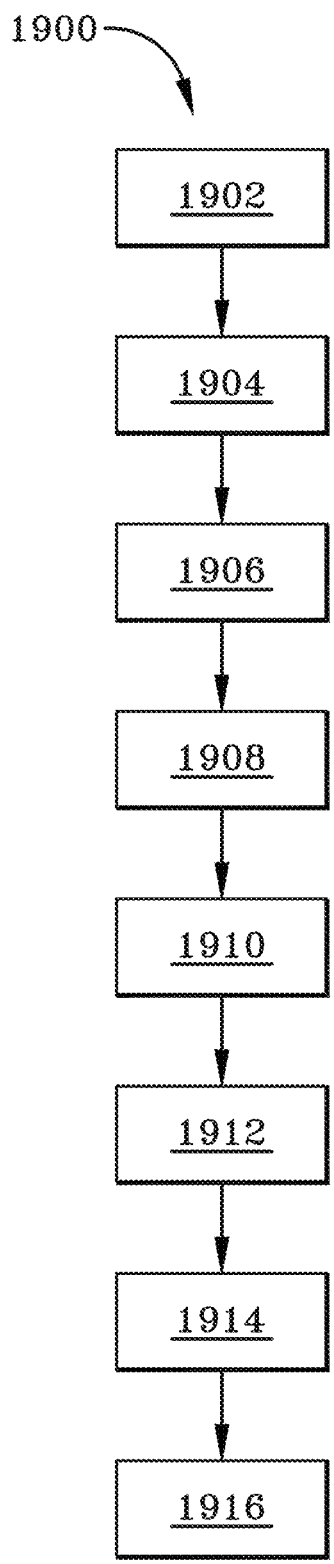

FIG. 19 is a flow chart depicting an exemplary method in accordance with one aspect of the present disclosure.

Figure 20:
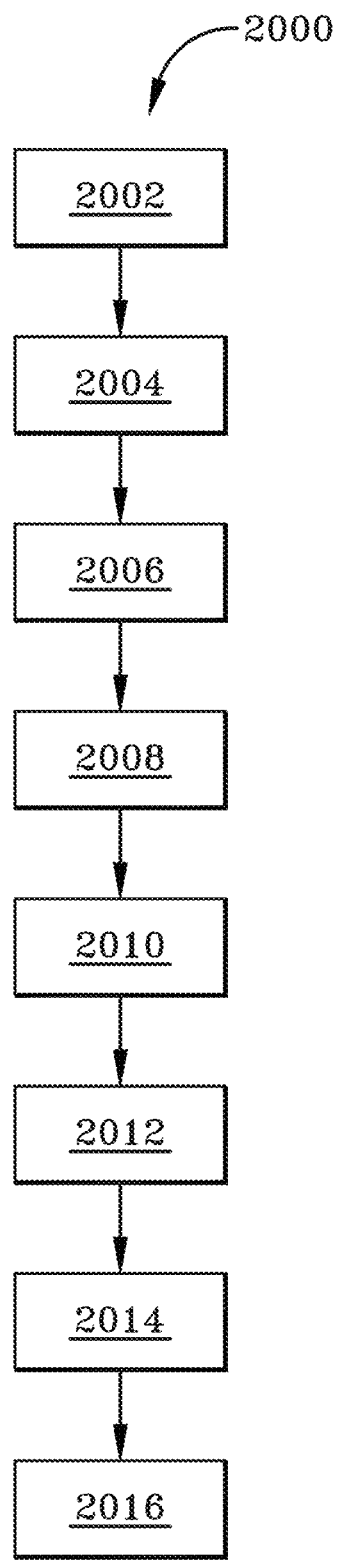

FIG. 20 is a flow chart depicting an exemplary method in accordance with one aspect of the present disclosure.

Similar numbers refer to similar parts throughout the drawings.

DETAILED DESCRIPTION

Figure 1:
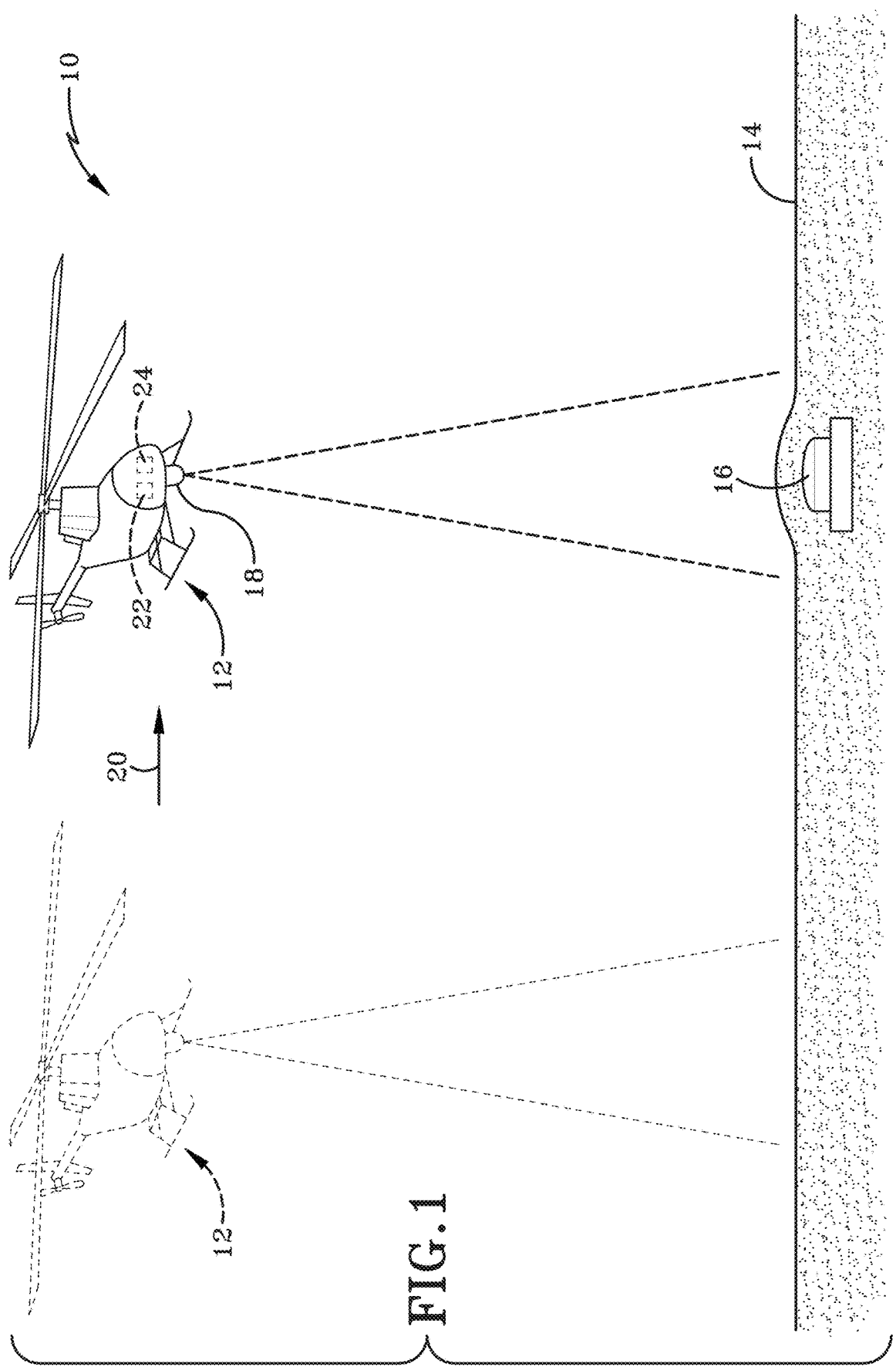
FIG. 1 is a diagrammatic view of a system of detecting a subsurface object in accordance with the present disclosure.

FIG. 1 depicts generally a detection system that takes advantage of a polarization change in a ground surface in order to determine whether an object is present below the surface (i.e., an object detection mode) or whether an object has changed a surface (i.e., an object tracking mode). The system is generally depicted at 10. System 10 may include a platform 12 that is positioned above a surface 14 and configured to detect an object 16 positioned below the surface 14 (or an object 16 that has altered surface 14). Platform 12 carries a polarization change detection (PCD) detector 18. In one particular embodiment, platform 12 is positioned at a vertical height above the surface 14 and the PCD detector 18 is oriented to observe, detect, and sense in the downward vertical direction such that the PCD detector 18 may view the surface 14.

Platform 12 may be a moveable platform configured to move from a first position to a second position in the direction of arrow 20. The first position of the platform 12 is indicated in dash lines and the second position of the platform 12 is indicated in solid lines. Furthermore, the first position of the platform 12 associated with a first time ($T_1$) and the second position of the platform 12 is associated with a subsequent second time ($T_2$). Platform may be movable to a multitude of positions, each associated with a subsequent later time ($T_N$). While platform 12 is depicted as a helicopter or rotorcraft, it is to be understood that the platform may be any form of vehicle or platform. For example, the platform may be a fixed wing aircraft, an unmanned aerial vehicle or drone, or any other moveable platform. Further, the platform 12 does not need to be an aerial vehicle as those referenced above. For example, the platform 12 may be a land-based vehicle, such as a tank or truck, that still positions the PCD detector 18 vertically above the ground surface 14 and is aimed downwardly to observe the same. Even further, the platform 12 does not need to be moveable, as indicated above. Platform 12 may be a fixed tower that positions the PCD detector 18 at a vertical height above the surface 14. When the platform 12 is embodied as a fixed tower, the tower or platform 12 does not move relative to the ground surface 14; however, the PCD detector 18 is able to capture images at a first time $T_1$, a subsequent second time $T_2$, and/or a series of subsequent times $T_N$, as will be described in greater detail below. An exemplary application would be to apply this fixed platform 12 of the present disclosure to determine where shrapnel landed in the sand. Thus, if something explodes or if a bullet lands and it disturbs the surface of the sand, then the system of the present disclosure will see the change when its imager on the PCD detector 18 is observing the sandy surface. Furthermore, PCD detector 18 may be a handheld device.

In each type of platform 12, system 10 is able to effectively utilize the measurements from the PCD detector 18 to detect the presence of an object 16 in the subterranean aspect of the surface 14 (i.e., below the ground surface) in order to detect the same. As will be described in greater detail below, the system 10 utilizes measurements from the PCD detector 18 to detect small scale changes in the surface 14 by measuring changes in a polarization statistic CS' across the surface 14. Particularly, the PCD detector 18 measures the degree of linear polarization (DOLP) at the first time $T_1$ and the second time $T_2$ (and any other number of subsequent times $T_N$). Then, a processor 22 executes instructions that are stored in a memory or at least one non-transitory computer readable storage medium 24 to compute the change in DOLP across the surface 14 and detect surface changes by identifying regions of anomalously high changes in the DOLP ($\Delta$DOLP) from the first time $T_1$ to the second time $T_2$, the first time $T_1$ to any subsequent time $T_N$, or between any two particular times (e.g. $T_2$ to $T_N$).

Surface 14, in one particular embodiment, is a sandy surface formed, at least partially, from quartz, calcite, or both. Further, while FIG. 1 depicts surface 14 as being substantially horizontal, this is not intended as limiting. It is fully contemplated that system 10 may equally function in angled, inclined, or even vertical surfaces. Furthermore, it is possible that the present disclosure operate in conjunction with non-sand surfaces. Particularly, any surface can work in conjunction with system 10 provided that the surface changes DOLP in response to an external excitation or agitation. Thus, the surface 14 may be any natural or man-made surface, at any orientation, that changes its DOLP in response to an external stimulus.

Object 16 is buried or otherwise disposed, at least partially if not entirely, below the surface 14. In one particular embodiment, object 16 is a man-made object typically in a combat theater, such as a land mine or improvised explosive device (IED). Particularly, one aspect of the present disclosure may utilize system 10 to detect buried land mines on a beach (i.e., a sandy surface 14). However, the present disclosure extends well beyond detecting land-mines on a beach. For example, the concepts of the present disclosure can be utilized to detect the presence of any object below a surface. Accordingly, the present disclosure may also be used to located man-made objects, such as tunnels. However, natural objects existing below the surface may also be detected. Furthermore, aspects of the present disclosure may apply system 10 to human biological detections systems configured to detect the presence of an object below the skin. Thus, while FIG. 1 depicts the object 16, generally as a landmine, it is to be understood that the object to be detected may be any object below a surface that causes a change in the surface polarization statistics.

The depth at which the object 16 is below the surface may vary. However, it is envisioned that lower powered acoustic sources 56 (FIG. 2B) will not necessarily be sufficient to detect objects located at deep depths. However, higher-powered acoustic sources may be more capable of detecting objects at greater depth. Aspects of the present disclosure contemplate that engineering capabilities would need to test and account for a balance in detection depth of the system 10 against the size, weight, and power requirement of the system 10. However, using a conventional laser 28 (FIG. 2A) and acoustic sources 56 (FIG. 2B) that is part of a laser interferometric sensor system 52 (FIG. 2B) should be able to detect object in a range from just below the surface to an operationally useful depth determined by the particular implementation. This detection depth capability also depends on the size and acoustic properties of the object 16 to be detected.

Storage medium 24 carried by platform 12 may be any non-transitory computer readable storage medium having instructions encoded thereon, that when executed by processor 22, implement operations to locate object 16 below surface 14. As will be described in greater detail below, the instructions on storage medium 24 control imaging components (i.e., sensors, cameras, imagers, lasers, and the like) on the platform 12 to obtain image pairs of the surface 14 at the first time $T_1$ and a subsequent series of times $T_N$ and then to perform imagery analysis of the same using a change in the DOLP from the first image at $T_1$ to each subsequent image at each time $T_N$. Further, the instructions determine whether anomalously high changes in DOLP indicate the presence of object 16 below the surface 14, and if so, generating an alert/signal indicating the same. These anomalously high regions alert the system 10 of an object 16 buried below the surface 14. Further, the time at which each pixel decorrelates relative to the image taken at time $T_1$ may provide additional information relating to the depth, shape, composition, and/or relative position of the object 16, which may further provide data from which the identity of the object 16 may be ascertained.

Figure 2A:
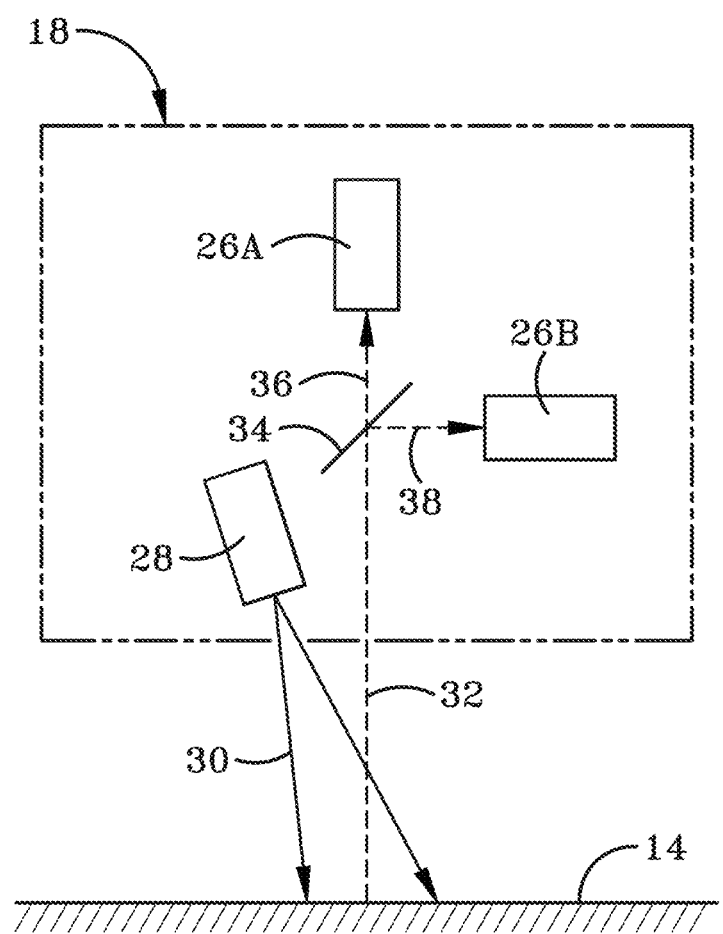
FIG. 2A is a schematic view of an exemplary polarization change detection (PCD) detector.
Figure 2B:
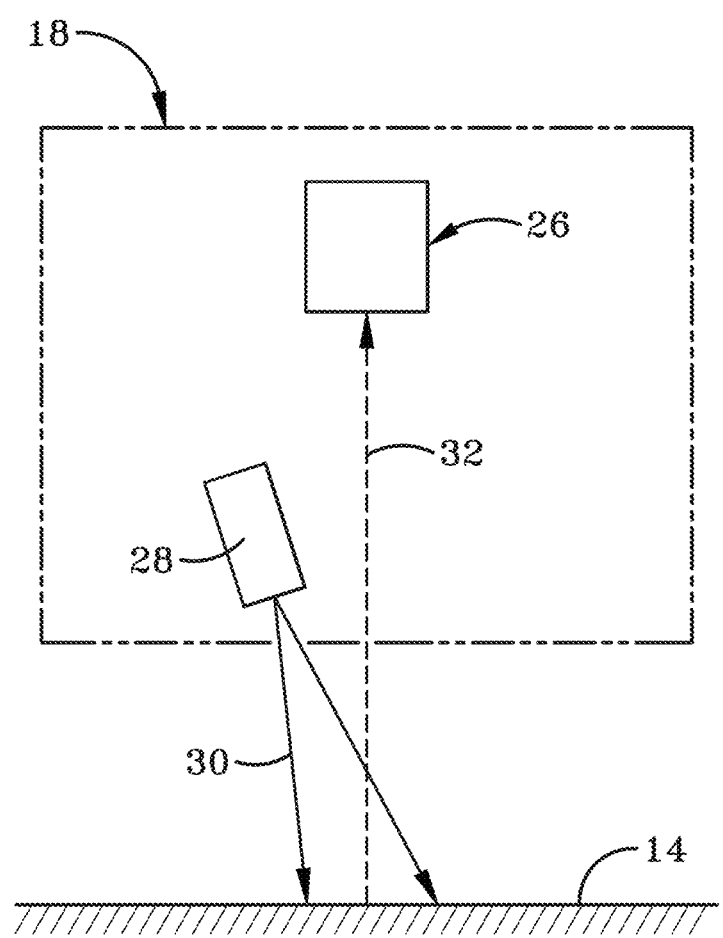
FIG. 2B is a schematic view of a second exemplary polarization change detection (PCD) detector.

FIGS. 2A and 2B schematically depicts a PCD detector 18. The PCD detector 18 may include a single camera 26 having a first portion 26A and a second portion 26B (FIG. 2A). The first portion 26A of the camera 26 or image sensor is configured to capture and sense a co-polarized channel and the second portion 26B is configured to image and sense a cross-polarized channel. While the PCD detector 18 includes a single camera 26 that has the first portion 26A and the second portion 26B configured to image the co-polarized channel and cross-polarized channel, respectively, it is entirely possible that 26A may represent a first camera 26 or imager and 26B may represent a second camera 26 or imager such that a two-camera system could be utilized to accomplish the PCD detector 18 of the present disclosure. PCD detector 18 includes components, hardware, and/or logic, or both that which convert different circular or elliptical polarization states into linear polarization states distinguishable by DOLP.

The PCD detector 18 may not need two cameras to respectively measure the co-polarized channel 36 and the cross-polarized channel 38. Rather, polarization image sensors (i.e., PCD detector(s) 18) have vastly improved in recent years and there are many types of polarization image sensors that can measure the co-polarization and cross-polarization channel in a single device, such as camera 26 (FIG. 26). For example, recent polarization cameras can now measure four polarization directions (i.e., 0°, 45°, 90° and 135° relative to the incident polarization direction) in one imaging device with new mass-produced focal planes. Thus, according to one aspect, the PCD detector 18 of the present disclosure may be a single camera 26 or image sensor with a Bayer pattern polarization filter.

Figure 2C:
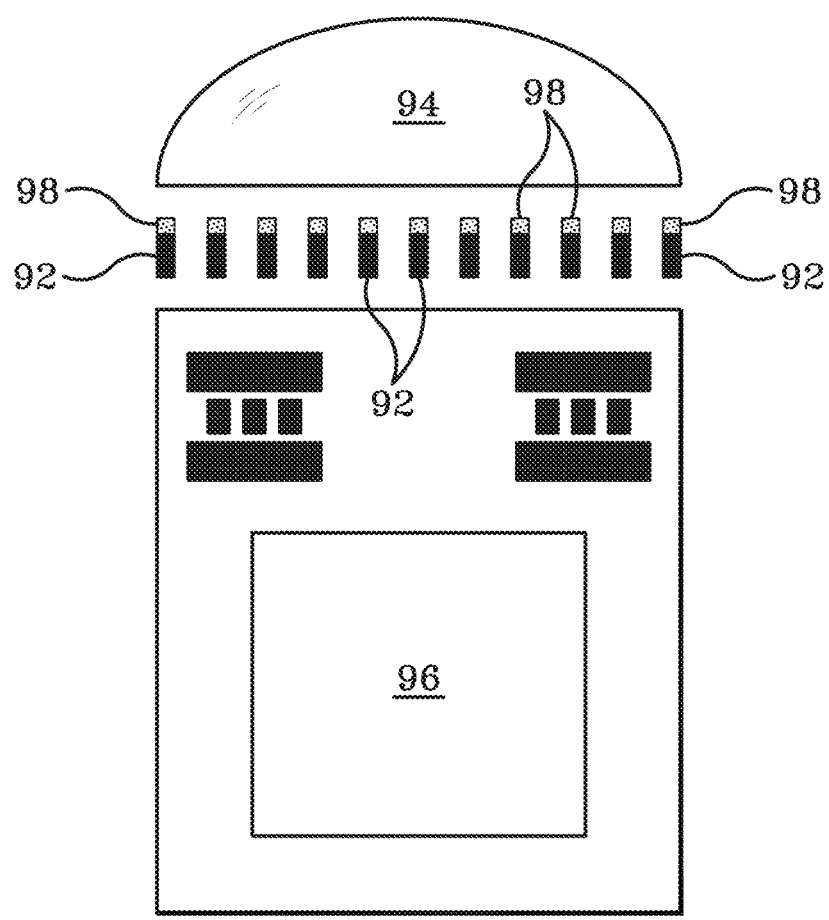
FIG. 2C is a schematic view of an imager within PCD detector.

According to this aspect, and with reference to FIG. 2C, camera 26 may include a polarizing filter 92 for each individual pixel within the camera 26 that may be oriented to 0°, 45°, 90°, and 135° and may be arranged in in 2×2 repeating pixel blocks. The polarizing filter 92 may be positioned between a micro lens 94 and a light sensitive photodiode 96 and may include an antireflective layer 98 or coating thereon. This arrangement allows camera 26 to sense four different angles of polarization simultaneously which may further allow for measurement of the angle and intensity of the return light signal 32 in any orientation across the full field of view of camera 26. Stated otherwise, the PCD detector 18 can be any image sensor that measures at least two linear polarization channels on the return signal beam or reflected light 32.

PCD detector 18 may further include a laser transmitter 28 that generates a polarized laser beam 30 configured to contact the ground surface 14. PCD detector 18, as will be described in greater detail below, images and senses a return light signal 32. States otherwise, return light signal 32 is a reflected beam of electromagnetic radiation that is observed by the PCD detector 18. PCD detector 18 may further include a beam splitter 34 configured to split the reflected return light signal 32 into a co-polarized channel 36 and a cross-polarized channel 38. The co-polarized channel 36 is directed to the first portion 26A of the image sensor and the cross-polarized channel 38 is directed to the second portion 26B of the image sensor. Furthermore, while the laser transmitter 28 is depicted as being a part or within the PCD detector 18, it is to be understood that the laser transmitter 28 may be external to the PCD detector 18 or may be part of an existing legacy laser system carried by the platform 12 and could cooperate with the PCD detector 18 and does not need to be integrally formed therewith. An exemplary PCD system(s) 10, which is commonly owned by the Applicant (at the time of filing), is detailed in U.S. patent application Ser. No. 16/135,164, which was filed on Sep. 19, 2018, the entirety of each is incorporated herein by reference as if fully rewritten.

Figure 2D:
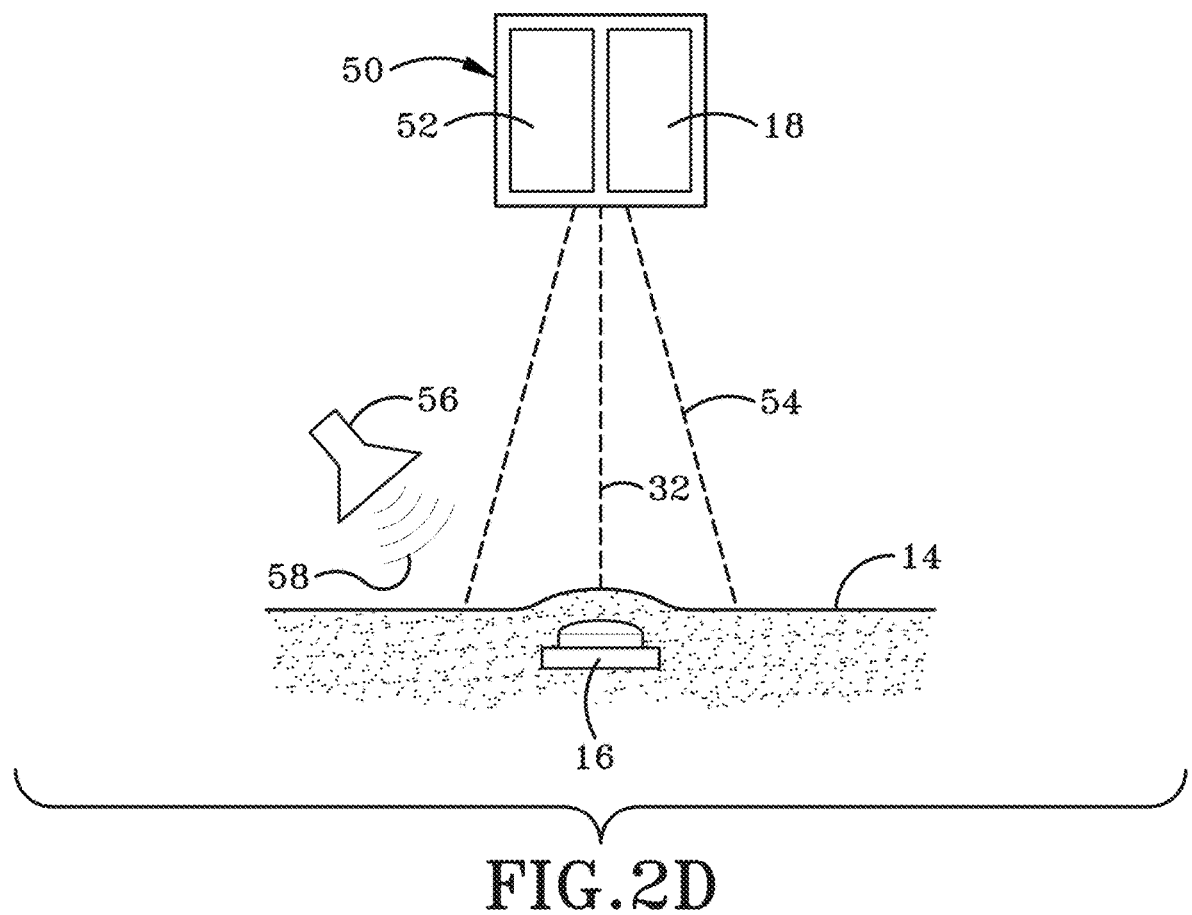
FIG. 2D is a schematic view of the PCD detector of FIG. 2A coupled with a laser interferometric sensor (LIS) system to form a combined PCD/LIS detection assembly.

FIG. 2D depicts a combined detection assembly or system generally at 50. The combined detection assembly 50 may include the PCD detector 18 and a laser interferometric sensor (LIS) system 52. A reader of the present disclosure will have an understanding of laser interferometry and LIS systems 52. Accordingly, for brevity, the LIS system 52 is not discussed in greater detail. However, some exemplary LIS system(s) 52, which are commonly owned by the Applicant (at the time of filing), are detailed in U.S. Pat. Nos. 9,671,521 and 10,048,229, the entirety of each is incorporated herein by reference as if fully rewritten.

The PCD detector 18 and the LIS system 52 cooperate such that the combined LIS and PCD system or assembly 50 may have a common field of view 54 when carried by the platform 12 above the ground surface 14 to detect the buried object 16. The combined LIS and PCD system or assembly 50 may further include an acoustic modulator 56 configured to direct sound waves 58 or other disturbances towards the ground surface 14. In another embodiment, the combined LIS and PCD assembly 50 does not need to use an acoustic modulator 56 emitting sound waves 58, but rather may use a different type of modulation device that can impart a vibration to the buried object 16 in order to change the polarization of the surface 14 such that the reflected light 32 changes polarity between the first time $T_1$ and the subsequent second time $T_2$. The combined PCD and LIS assembly 50 may provide advantages over a lone LIS system 52 inasmuch as a LIS system 52 is very sensitive to small surface changes, but has difficulty measuring changes larger than a few times the laser illumination wavelength. Since the PCD detector 18 can measure changes much larger than the laser illumination wavelength, when the PCD detector 18 is used in combination with the LIS system 52, the overall combined LIS and PCD assembly 50 has an extended dynamic range than what a LIS system 52 would have alone. Further, a LIS system 52 already includes a laser transmitting source, such as laser transmitter 28 and the acoustic modulator 56. Thus, the PCD detector 18 may be integrated with a conventional or legacy LIS system 52 to form the combined LIS and PCD detection assembly 50 and take advantage of existing hardware (i.e., laser transmitter 28 and acoustic modulator 56) without significantly increasing size, weight, and power (SWaP) of the system 10 or the platform 12. The combined LIS and PCD detection assembly 50 may further provide an advantage of detecting the buried object 16 because the shape of the PCD signal above the buried object 16 represents a direct outline thereof. Thus, the PCD signal has different characteristics than the shape of the LIS shearogram image. Thus, using both the PCD detector 18 and the LIS system 52, namely, the images provided by the same, improves the overall system's ability to classify observed detections below the surface 14.

FIG. 2D depicts that PCD detector 18 and the LIS system 52 may be collocated to define the combined PCD and LIS detection assembly 50. While it may be advantageous to collocate the PCD detector 18 and LIS system 52 into the combined assembly 50, it is not mandatory. The components of the combined detection assembly 50 may be segregated and the system 10 would still function. However, in order to reduce SWaP parameters, it is likely desirable to collocate the PCD detector 18 and the LIS system 52. Towards this end, PCD detector 18 and LIS system 52 would likely share the same field of view 54. However, the system 10 would still be operable if the two respective images from the PCD detector 18 and the LIS system 52 did not share a similar field of view. In this instance, more processing and algorithms would be necessary to line up the respective images so that combined system 50 could provide PCD results and LIS results to the operator.

Figure 3A:
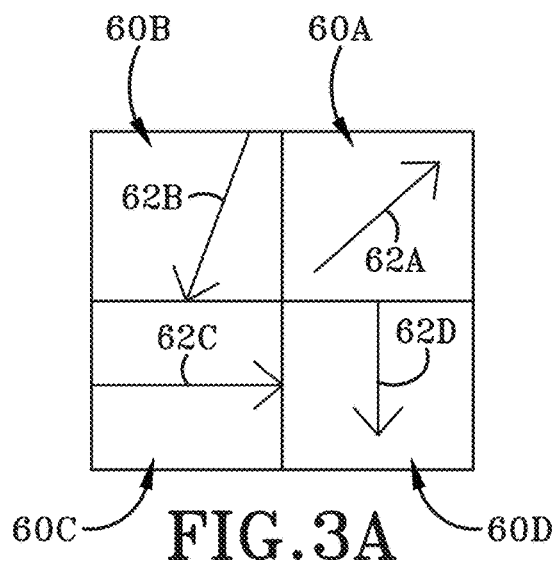
FIG. 3A is an enlarged diagrammatic view of the surface formed from sand indicating that polarization angles of the reflected light vary per pixel based on the orientation of each grain of sand and that a small number of grains of sand approximates the size of a pixel.

FIG. 3A depicts an enlarged diagrammatic view of the surface 14. In this instance, the surface 14 is fabricated from sand, such as sand comprising quartz or calcite. The enlarged view in FIG. 3A depicts the footprint of four pixels, where each pixel footprint is approximately the size of a few grains of sand. Here, a first pixel footprint is represented by 60A, a second footprint 60B, a third footprint 60C, and a fourth footprint 60D. Each pixel footprint, respectively, has an arrow representing the polarization angle of the reflected light 32 based on the arrangement or angle of the grains of sand. The first angle of reflected light 62A is different than the second angle 62B of reflected light, which is different than the third angle 62C of reflected light which is different from the fourth angle 62D of reflected light. The high resolution of PCD detector 18 enables a single or small number of grains of sand, to occupy or approximate a single pixel in each sampled image. The polarization angles 62A-62D of the reflected light 32 are a function of the random orientation of the sand grains 60A-60D. The resultant reflected signal of the incident light 32 is randomly polarized (i.e., each pixel has a random polarization angle). This randomly polarized effect is particularly pronounced for quartz and calcite sands due to the birefringence of the individual grains of sand.

Figure 3B:
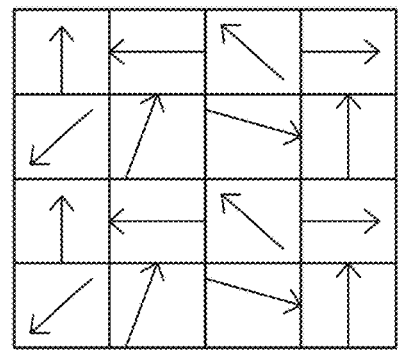
FIG. 3B is an enlarged diagrammatic view of the surface formed from the sand indicating that polarization angles of the reflected light average to 0 when a sufficiently large number of grains of sand approximate the size of a pixel.

FIG. 3B represents a scenario where the resolution is not as great and many grains of sand are represented in a single pixel. Because each pixel integrates over many polarization angles, the resultant signal is unpolarized such that the degree of linear polarization averages to zero for each pixel. In general lower resolution (larger pixel footprint) decrease the pixel to pixel polarization difference in the reflected signal, thereby decreasing the sensitivity of polarization change detection.

FIG. 3A and FIG. 3B diagrammatically represent that the calculation of the polarization angle of the reflected light 32 is utilized by the system 10. Particularly, the system 10 may determine degree on linear polarization (DOLP) for each pixel. The DOLP for each pixel at each respective time is calculated by the following formula:

$$DOLP = \frac{copol - xpol}{copol + xpol} \quad \text{(Equation 1)}$$

wherein copol refers to the co-polarization channel 36 and xpol refers to the cross-polarization channel 38. It should be noted that any statistic that measures the degree and or direction of the linear polarization of each pixel may be used in place of DOLP. Stated otherwise, the system 10, namely, one of the processors determines a statistic associated with the DOLP. For example, one of the processors determines a statistic S, where S is some measure of the degree and/or direction of the linear polarization and is computed for a plurality of image pixels. In one particular embodiment, this is done for every image pixel. Further, the statistic S may be, but is not required to be, the degree of linear polarization (DOLP). In other examples, the processor may determine the statistic S, which may represent measures of frequency pertaining to the reflected signal or other signals; or may represent measures of tendency pertaining to the reflected signal or other signals; or may represent measures of dispersion or variation pertaining to the reflected signal or other signals; or may represent measures of measures of position pertaining to the reflected signal or other signals; and the like.

FIG. 4A and FIG. 4B represent an application of the system 10 of the present disclosure in which the PCD detector 18 is used to detect small surface changes. FIG. 4A represents the surface 14 before the surface has changed and FIG. 4B represents a time subsequent to when the surface 14 has changed. As such, the surface 14 is shown canted or angled in FIG. 4B relative to the generally horizontal surface 14 depicted in FIG. 4A. The incoming polarized laser beam 30 impacts a region 64 on the surface 14 at a time $T_1$. The incident reflection beam 32 is transmitted back to the PCD detector 18. FIG. 4B indicates that the laser beam 30 is still contacting the region 64 of the surface 14 after the surface 14 has tilted or otherwise moved. When the incident light hits the surface 14 and the surface 14 tilts, the reflected incident light from the surface 14 at the location that has been tilted will have a different polarization content. Thus, the system of the present disclosure is used to detect small surface changes which may be the result of shifting or tilting of the surface 14 and to measure the DOLP of the surface 14 at two times relative to the surface change. Such small surface changes may occur on the surface above a buried object, which has been induced to vibrate by application of an external acoustic source or by some other means.

There are two exemplary formulas that may be used to compute the change in DOLP ($\Delta$DOLP). The first method may use the following formula:

$$\Delta DOLP_{method1} = (DOLP(T_1) - DOLP(T_2)) \quad \text{(Equation 2)}$$

It is sometimes useful to work with just the magnitude of $\Delta$DOLP:

$$\Delta DOLP_{method2} = \sqrt{(DOLP(T_1) - DOLP(T_2))^2} \quad \text{(Equation 3)}$$

For signal strength calculations it may be most useful to work with the square of the $\Delta$DOLP defined by the following formula:

$$\Delta DOLP^2 = (DOLP(T_1) - DOLP(T_2))^2 \quad \text{(Equation 4)}$$

Processing logic in system 10 may apply a low pass filter, as well as spatial averaging to determine $\Delta$DOLP. The regions of the image where the average $\Delta$DOLP or $\Delta DOLP^2$ is large indicates regions where the surface has changed. This conforms to the presence of a resonating buried object. In one particular embodiment, a processor, such as processor 22 working in conjunction with memory 24, executes instructions to determine the change in DOLP in accordance with the formulas discussed above. The output from the processor is a signal generated from the change in DOLP or the average change in DOLP to alert the presence of an object buried in the surface 14.

PDTI may be used to quantify the decorrelation of an image over time using the DOLP statistic. Consider, therefore, a region of surface 14 that is illuminated by the by the PCD detector 18, or more particularly, the polarized laser beam 30, with images taken in the copol and xpol channels at a first and subsequent second time, $t_1$ and $t_2 = t_1 - \tau$ which can then be used to compute the DOLP of an image region (x,y) at times $T_1$ and $T_2$ using:

$$DOLP(x, y, t_1) = \frac{I_{copol}(x, y, t_1) - I_{xpol}(x, y, t_1)}{I_{copol}(x, y, t_1) + I_{xpol}(x, y, t_1)} \quad \text{(Equations 5 and 6)}$$

$$DOLP(x, y, t_2) = \frac{I_{copol}(x, y, t_2) - I_{xpol}(x, y, t_2)}{I_{copol}(x, y, t_2) + I_{xpol}(x, y, t_2)}$$

Where $I_{copol}$ and $I_{xpol}$ are the co-polarization cross-polarization images, respectively. The correlation between the DOLP images may then be expressed as:

$$\rho_{DOLP}(x,y,y) = \rho\{DOLP(x,y,t_1=0), DOLP(x,y,t_2=\tau)\} \quad \text{(Equation 7)}$$

FIG. 5A and FIG. 5B represent exemplary cross-sections of images. Particularly, FIG. 5A represents an exemplary cross-section of an image at a first time $T_1$. FIG. 5B represents an exemplary cross-section of an image at a subsequent second time $T_N$ indicating that a region 66 of the surface 14 has changed. In this particular instance, the region 66 indicates that the surface 14 has increased its profile height. DOLP images are generated (according to equation 1) for the first time (FIG. 5A) and the second time (FIG. 56). These images are combined (according to equation 2 or equation 3) to generate a $\Delta$DOLP image. Equivalently the images can be combined with equation 4 to generate a $\Delta DOLP^2$ image. FIG. 5C represents an image depicting $\Delta$DOLP from the first image of FIG. 5A to the second image of FIG. 5B. The background region 68 provides a $\Delta$DOLP equal to or approximating zero, as indicated by absence of shading in the background region 68. The target central region 70 indicates that the raised region 66 identifies a change in the surface 14.

Both DOLP($T_1$) and DOLP($T_N$) can be described by statistical distributions with mean ($\mu$) and variance ($\sigma^2$). If a suitable high pass filter operation is applied to the raw copol and xpol images then the mean of the DOLP images p goes to zero. The system may define the DOLP image of the target for a changed region as $DOLP_T$ (region 70 in FIG. 5C) and the DOLP image of the background (unchanged) region as $DOLP_B$ (region 68 in FIG. 5C). Making these same definitions for the first time $T_1$, and the subsequent time $T_N$, there are four DOLP quantities of interests: $DOLP_T(T_1)$, $DOLP_T(T_N)$, $DOLP_B(T_1)$ and $DOLP_B(T_N)$; each of these four quantities will be normally with mean $\mu=0$, and standard deviation a. Thus even in the target region, where the surface changes going from $T_1$ to $T_N$, the DOLP remains normally distributed with the same mean and standard deviation as before. The target and background DOLP regions, however, have different degrees of correlation between their $T_1$ to $T_N$ distributions. While the exemplary case described here postulates normally-distributed statistics, it will be understood that the methods described herein may apply for polarizations with any distributions with defined means and variances.

The correlation coefficient between $DOLP(T_1)_T$ and $DOLP(T_N)_T$ is defined as $\rho_T$. The correlation coefficient between $DOLP(T_1)_B$ and $DOLP(T_N)_T$ is defined as $\rho_B$. The PCD signal strength, $\Delta DOLP^2$ in the target region ($\Delta DOLP^2_T$) relative to $\Delta DOLP^2$ in the background region ($\Delta DOLP^2_B$), can be described in terms of these two correlation coefficients.

As it relates to PTDI, the correlation coefficients $\rho_T$ and/or $\rho_B$ may be measured relative to a predefined threshold, $\rho_{Threshold}$, to determine at what time a specific pixel decorrelates. The threshold $\rho_{Threshold}$ may be predetermined based on a variety of factors, such as what type of substrate the surface 14 is composed of (i.e. sand v. soil, etc.), the type of object being located, or other similar factors. The threshold $\rho_{Threshold}$ may represent a correlation coefficient between a perfect correlation (1.0) and a zero correlation (0) that may allow a user to reliably determine that a particular pixel has decorrelated to statistical significance. According to one example, the threshold $\rho_{Threshold}$ may be in a range from 0.7 to 0.3. According to another example, the threshold $\rho_{Threshold}$ may be 0.5.

Each DOLP image, or more particularly, each pixel in each DOLP image starts out as perfectly correlated and will decorrelate over time due to gradual changes in the surface 14 as acoustic modulator 56 directs sound waves 58 or other disturbances into an object 16 buried under the surface 14. Specifically:

$$\lim_{\tau \to 0}[\rho_{DOLP}(x, y, \tau)] = 1$$

$$\lim_{\tau \to \infty}[\rho_{DOLP}(x, y, \tau)] = 0$$

An image pair, for example a DOLP image between time $T_1$ and $T_2$, may be operationally defined as being decorrelated when the correlation coefficient $\rho_T$ and/or $\rho_B$ drops below the threshold. Specifically, when $\rho_{DOLP}(x,y,\tau) \leq \rho_{Threshold}$. From this condition, the decorrelation time ($T_{DC}$) may be defined as $\rho_{DOLP}(x,y,\tau_{DC}) = \rho_{Threshold}$. For a series of DOLP images collected by PCD detector 18, a decorrelation time image may be easily computed. The image set gives a sequence of values $\rho_{DOLP}(x,y,\tau_i)$, where $\tau_i$ n/f and f is the frame rate. From there, this sequence may be used to calculate $T_{DC}$ at every point (x,y) within the decorrelation time image, with $T_{DC}(x,y)$ thus defining the PDTI image.

Figure 6A:
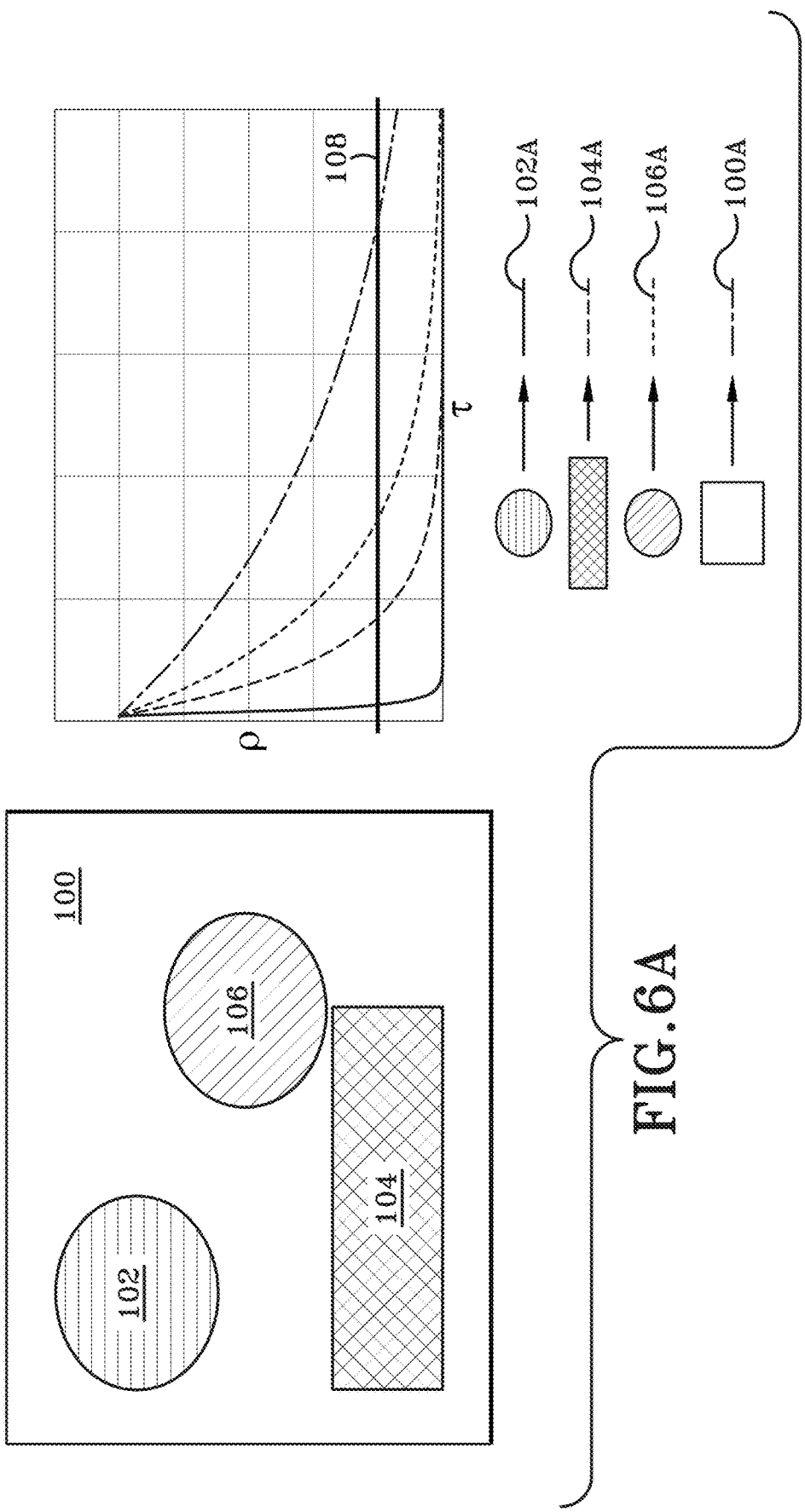
FIG. 6A is an exemplary polarization decorrelation time imaging (PDTI) image showing three exemplary buried objects and further depicts a graphical representation of the decorrelation times thereof relative to the background.
Figure 6B:
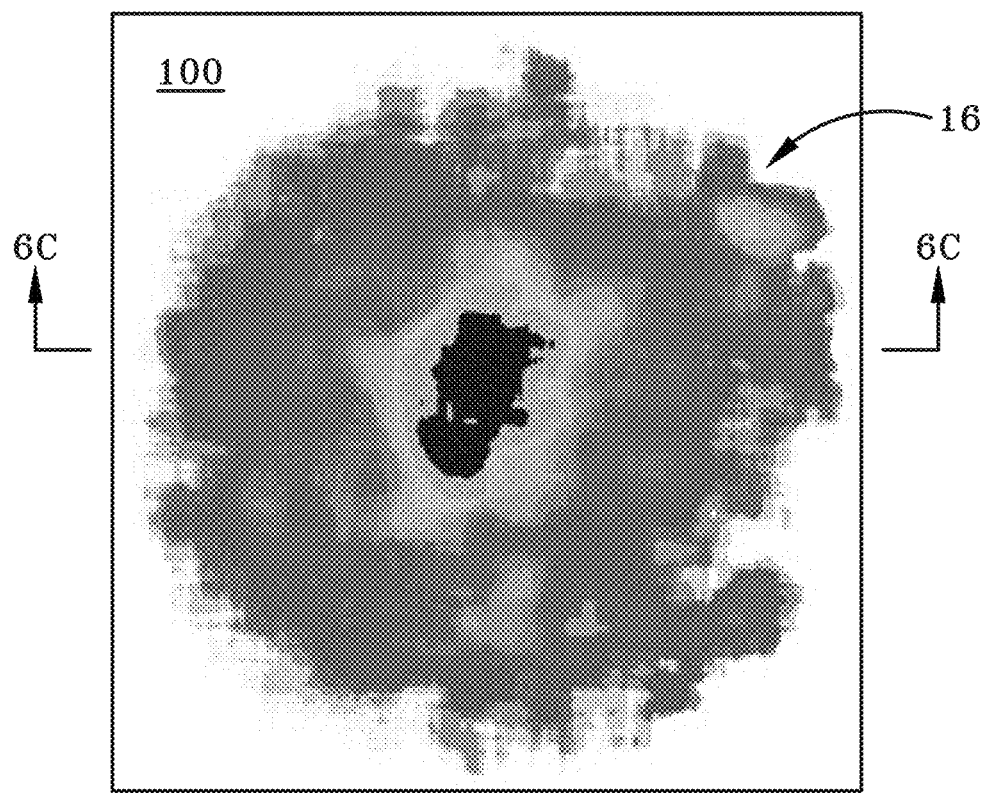
FIG. 6B is a pixel map showing the decorrelation times of each individual pixel within a field of view of the PCD detector.
Figure 6C:
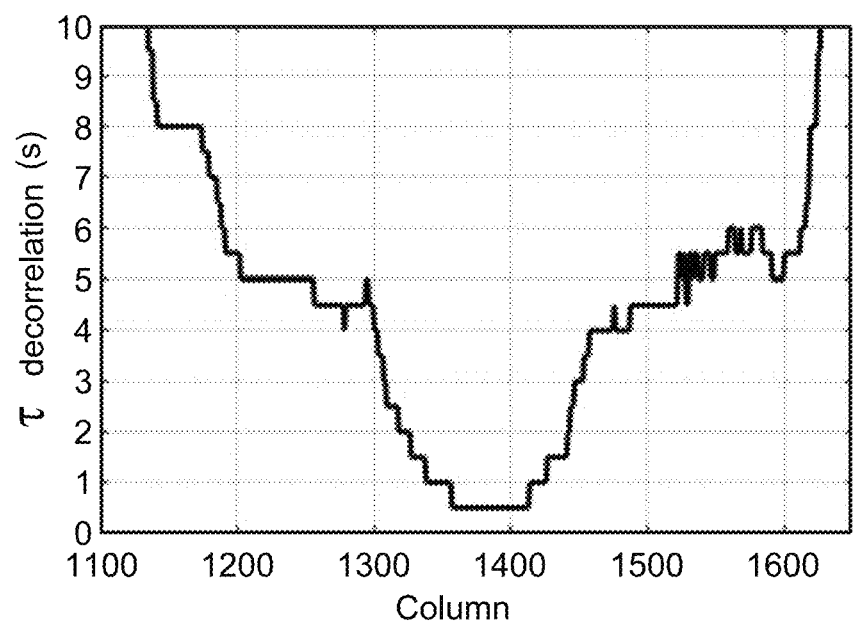
FIG. 6C is a graphical representation of a cross-section of the pixel map taken along the line indicated in FIG. 6B showing the decorrelation times of an object.

FIGS. 6A-6C show a sample PDTI image using three buried objects in a uniform background 100, such as sand. The surface 14 above each object is assumed to have a separate decorrelation process and time from the buried objects. The left side of FIG. 6A shows a shallow resonant object 102 with a rapid decorrelation time, a shallow non-resonant (solid) object 104, and a deep object 106 with a long decorrelation time. The right side of FIG. 6A shows the decorrelation process (i.e. correlation v. time) for each object type. The point where each line 100A, 102A, 104A, and 106A intersects the $\rho_{Threshold}$ (line 108 in FIG. 6A) is the decorrelation times for each relative object 102, 104, 106, and background 100. FIG. 6B shows a pixel map where the darker regions indicate a faster decorrelation time $T_{DC}$ and the lighter pixels represent a slower decorrelation time $T_{DC}$. FIG. 6C is a graphical representation of a cross-section of the pixel map shown in FIG. 6B. As shown in FIGS. 6B and 6C, the object 16 buried under the surface 14 appears to decorrelate faster towards the center and more slowly towards the edges. This, according to one example, may indicate that the object 16 is buried shallower in the center and deeper towards the edges, which in turn may provide that the object 16 is dome shaped or spherical. According to another example, the change in decorrelation time may be indicative of the composition, density, or the like of the object 16 under the surface.

With respect to the statistics of the signal, there are implications for $\Delta DOLP$. Namely, the variance of the difference of two correlated normal distributions (1 and 2) is $\sigma^2 = \sigma_1^2 + \sigma_2^2 - 2\rho\sigma_1\sigma_2$, where p is the correlation coefficient.

The $\Delta DOLP$ distribution over the target is identified by the mean $\mu_T=0$ and the standard deviation $\sigma_T=\sqrt{2(1-\rho_T)^2}$.

The $\Delta DOLP$ distribution over the Background is identified by the mean $\mu_B=0$ and the standard deviation $\sigma_B=\sqrt{2(1-\rho_B)^2}$.

With respect to an exemplary method of operation of the present disclosure, system 10 may use a function of $\Delta DOLP$, for example $F=\Delta DOLP^2$, where $\Delta DOLP^2$ is defined in Equation 3. The target signal-to-noise ratio (SNR) is then $$SNR_F = \frac{\mu_{FT} - \mu_{FB}}{\sigma_{FB}}.$$

Wherein $\mu_{FT}$, $\mu_{FB}$, and $\sigma_{FB}$ are the mean over the target, the mean over the background region 68, and the standard deviation of the background region 68 all computed over the $\Delta DOLP^2$ image, respectively.

The $F=\Delta DOLP^2$ example function yields the following formulas:

$$\mu_{FT}=2(1-\rho_T)\sigma^2 \qquad \text{(Equation 8)}$$

and $$\mu_{FB}=2(1-\rho_B)\sigma^2 \qquad \text{(Equation 9)}$$

and $$\sigma_{FT}=2\sqrt{2}\sigma^2(1-\rho_B) \qquad \text{(Equation 10)}$$

yielding:

$$SNR = \frac{2\sigma^2(\rho_B - \rho_T)}{2\sqrt{2\sigma^2(1-\rho_B)}} = \frac{(\rho_B - \rho_T)}{\sqrt{2}(1-\rho_B)} \qquad \text{(Equation 11)}$$

Where Equation 11 in interpreted as the single pixel SNR.

The Signal to Noise Ratio can be estimated with two parameters: $\rho_T$, and $\rho_B$. A finite signal exists as long as $\rho_T$ differs from $\rho_B$, which is equivalent to the statement that the change in DOLP over the target region must differ from the change in DOLP over the background region.

For large changes $$\rho_t \to 0 \text{ and } SNR \to \frac{(\rho_B)}{\sqrt{2}(1-\rho_B)}.$$

Correlation of the background region 68 must be preserved (i.e., large $p_B$) in order to achieve the maximum SNR signal.

FIG. 7A and FIG. 7B identify the first set of polarization images in accordance with a first test. FIG. 8A and FIG. 8B represent a second set of images from the first test. Thus, the images from FIG. 7A and FIG. 7B and the images from FIG. 8A and FIG. 8B define an image pair. More particularly, the image of FIG. 7A is a co-polarization channel image 72A at the first time $T_1$. FIG. 8B is an image 72B of the co-polarization channel at a second subsequent time $T_2$. FIG. 7B represents an image 74A in the cross-polarization channel at the first time $T_1$. FIG. 8B represents an image 74B in the cross-polarization channel at the subsequent second time $T_2$. The test target 76 is a region that is an undisturbed sand surface at the first time $T_1$. In the first image 72A, 74A, the sand surface is undisturbed within the test target region 76. Then, a user manipulated the sand surface within the test target region 76 be drawing a line in the sand, causing a disturbance in the surface of a few millimeters in height. Then, the second set of images identified in FIGS. 8A and 8B were obtained after the line was drawn in the sand surface.

FIG. 9A depicts the DOLP before the line in the sand surface 14 was drawn, and is computed with Equation 1, using a high pass filtered co-polarization channel image (FIG. 7A) and a high pass filtered cross-polarization channel image (FIG. 7B). FIG. 9B and depicts the DOLP after the line in the sand surface 14 was drawn, and is computed with Equation 1, using a high pass filtered co-polarization channel image (FIG. 8A) and a high pass filtered cross-polarization channel image (FIG. 8B).

FIG. 10A represents the $\Delta DOLP^2$ from the first time to the second time. The $\Delta DOLP^2$ clearly identifies the line in the sand 78. The experimental procedures identified through the images in FIG. 7A through FIG. 10B were accomplished through the following test procedures. The PCD detector 18 first captured a co-polarization image of the target region 76. Then, the PCD detector 18 took a cross-polarized image of the target region 76. Then, the test region 76 was altered. In this scenario, the manner in which the test region 76 was altered was accomplished by drawing a line in the sand. Subsequent to altering the target region 76, the PCD detector 18 captured an image of the co-polarized channel of the target region 76. Then, the PCD detector 18 captured an image in the cross-polarized channel of the target region 76. The data from the images obtained had a high pass filter applied to each image. The step of applying a high pass filter to image may be added to enhance the signal carrying high spatial frequency (random polarization) content of the image. The high pass filter may be accomplished through image processing tools and programs. Then, the processor calculates the (before) and (after) degree of linear polarization (DOLP1, DOLP2). System 10 uses the formula of Equation 1 to calculate the before and after degree of linear polarization. The method of the present disclosure may then continue in two separate manners. First, the method may calculate and filter the $\Delta DOLP$. This may be accomplished through the following formula:

$$\overline{\Delta DOLP^2} = \text{median filter}(\Delta DOLP^2) \qquad \text{(Equation 12)}$$

Alternatively, the system may calculate and filter a DOLP ratio (FIG. 9B) through the following formula:

$$DOLP_{Ratio} = \text{median filter}\left(\frac{DOLP2}{DOLP1}\right) \qquad \text{(Equation 13)}$$

FIG. 11A through FIG. 14B represent a second experimental test. In this particular example, the before images in the co-polarization channel and the cross-polarization channel are identical to those in FIG. 7A and FIG. 7B. FIG. 12A represents an image 80 in the co-polarization channel similar to image 72B taken at a time after the test region 76 has been altered. Similarly, image 82 in FIG. 12B represents the image in the cross-polarization channel after the test region 76 has been altered. In this second experiment, the manner in which the test region 76 was altered was accomplished by a small plunger that depressed the surface in the test region 76 a small distance of 15 um (µ). FIG. 13A and FIG. 13B depict the high pass filtered DOLP before and after the plunger has depressed the small region a distance of 15 micrometers, respectively. FIG. 14A and FIG. 14B depict the change in DOLP after the plunger depressed the region 84 a distance of about 15 micrometers; where FIG. 14A depicts the $\overline{\Delta DOLP^2}$ and FIG. 14B depicts $DOLP_{Ratio}$. The experiment results indicated that the PCD detector 18 is able to observe a change in the surface 14, namely, the depression 84, which was a change of about 15 micrometers (µm).

FIG. 15A through FIG. 18B represent a third experimental test. In this particular example, the before images in the co-polarization channel and the cross-polarization channel (FIG. 15A and FIG. 15B) are identical to those in FIG. 7A and FIG. 7B. FIG. 16A represents an image 86 in the co-polarization channel similar to image 72B taken at a time after the test region 76 has been altered. Similarly, image 90 in FIG. 16B represents the image in the cross-polarization channel after the test region 76 has been altered. In this third experiment, the manner in which the test region 76 was altered was accomplished by a small plunger that depressed the surface in the test region 76 a small distance of 8 um (µ). FIG. 17A and FIG. 17B depict the high pass filtered DOLP before and after the plunger has depressed the small region a distance of 8 micrometers, respectively. FIG. 18A and FIG. 18B depict the change in DOLP after the plunger depressed the region 84 a distance of about 8 micrometers; where FIG. 18A depicts the $\overline{\Delta DOLP^2}$ and FIG. 18B depicts $DOLP_{Ratio}$. The experiment results indicated that the PCD detector 18 is able to observe a change in the surface 14, namely, the depression 88, which was a change of about 8 micrometers (µm).

Collectively, the ΔDOLP images identified in FIG. 10A-FIG. 10B, FIG. 14A-FIG. 14B, and FIG. 18A-FIG. 18B identify that the calculations and system of the present disclosure may be utilized to identify changes or disturbances in the surface 14 that occur on a macro level (a line drawn in the sand; i.e., many millimeters or even a meter) and on a micro level (down to about 8 micrometers of change). While the experimental test results achieved success of identifying a change in the surface down to about 8 micrometers, it is contemplated that the present disclosure may be utilized for detection in the surface change on the order of about a micron or a few times the laser illumination wavelength. So long as the change in the surface 14 alters the polarization of the reflected light 32 between the first time $T_1$ and a second subsequent time $T_N$, detection remains possible.

As it relates to PDTI, the decorrelation of surface 14 occurs in a continuous, ongoing process which may result from the ambient vibration of the background 100. Thus, by utilizing the resolution of ΔDOLP images taken over a series of images, a continuous set of decorrelation time measurement data may be generated. This data may provide additional details regarding the composition, location, movement, size, shape, and/or density of a buried object (such as objects 102, 104, and/or 106). PDTI may further allow for detection and differentiation of multiple objects within a target region (such as region 76) of surface 14. According to one aspect, the series of N images may be taken at preset intervals over a specific period of time (e.g. every 2 milliseconds for 10 seconds) or may be taken at any interval for an indiscriminate period of time until a series is complete (e.g. take images until 100 images are collected). According to another aspect, images in the N series of images may be collected in varying intervals according to the desired implementation. For example, PCD detector 18 may begin taking images at an interval of one image each 0.1 milliseconds for a first time period, expanding that interval to each 0.5 milliseconds over a second time interval, before retracting that interval back down to 0.1 milliseconds during a third and final time interval. The specific intervals and number of images N in the series may vary depending on the desired implementation and objective.

Further, PDTI is sensitive to changes within the target region on multiple time scales, unlike previous detection methods which are typically only sensitive on a single time set scale. The sensitivity of PDTI is based on the time series data collection while taking advantage of the high resolution of ΔDOLP images.

Having thus described the components of the present disclosure, reference is now made to the operation of system 10 and how the present disclosure supplements and improves upon buried object detection systems.

One exemplary problem that persists that the present disclosure seeks to remedy is to improve upon LIS-based buried object detection systems. Another problem that the present disclosure addresses is providing a solution that has a higher amplitude ground displacement in its detection. Another problem that the present disclosure addresses is the general buried object change detection. Thus, the present disclosure provides an alternate method of observing surface vibration differences above a buried object in order to detect the same. Further the present disclosure provides a method for quantifying the observed changes in the surface above a buried object over time.

The present disclosure remotely detects changes induced by a buried object as the ground or surface 14 above the target 16 vibrates, moves, or alters. Alternatively, the target does not need to vibrate; rather, an external load may be applied to the ground surface to cause a change above the buried object so that the system of the present disclosure can detect the same. For example, the ground may be shaken or may be acoustically excited, thermally excited, or excited through an electromagnetic radiation spectrum. In each instance, as the ground surface above the buried object changes, the polarization signal of the ground above the buried object changes as well, thus enabling the object to be detected.

In operation and with respect to FIG. 2A, a pair of images is taken at time $T_1$ and a subsequent time $T_N$. The PCD detector 18 or a processor 22 executing instructions from at least one non-transitory computer readable storage medium 24 then computes the DOLP for each image pair within the series of images with both polarization channels as input. Then, the system 10 computes the $\Delta DOLP^2$ from Equation 4. The PCD detector 18 of FIG. 2A takes image pairs at different times and the time separating the first image from the second image is sufficient for affecting the disturbance on the ground so that a change in the degree of linear polarization statistic can be determined.

The present disclosure utilizes the PCD detector 18 to detect small changes in surface 14 by measuring changes in a polarization statistic across the surface. Specifically, the PCD detector 18 detects small surface changes by first measuring the DOLP in a first image at the first time $T_1$. This may be done by using an imaging device capable of measuring DOLP of the surface at high resolutions, wherein high resolution refers to about one millimeter such that a small number of grains of sand approximates the size of a single pixel. Then, a change to the surface is induced. The change to the surface above which an object is buried may be accomplished in a number of ways. For example, the change may be sonically induced through the use of acoustic waves or the change may be physically induced by wind or shaking the surface or any means which causes the buried target to move or vibrate. Next, the system uses the PCD detector 18 to repeat the measurements and detect the degree of linear polarization at a series of subsequent times $T_2$ through $T_N$. In some instances, the change in time from $T_1$ to $T_2$, or from any time $T_N$ as compared to any other specific time $T_N$, may be very small. For example, the difference between $T_2$ and $T_1$ may be on the order of about one millisecond. The system then determines the change in the statistic by calculating the change in the DOLP between time $T_2$ and time $T_1$. Namely, system 10 may use either Equation 12 to compute $\overline{\Delta DOLP^2}$ or Equation 13 to determine $DOLP_{Ratio}$, which is used to detect surface changes indicative of an object 16 below surface 14 by identifying regions of anomalously high changes in the DOLP. Similarly, when performing PDTI, system 10 may utilize equations 5 and 6 to calculate the DOLP of an image region (x,y) at times $T_1$ and $T_2$.

In one particular embodiment, the polarized light source is a polarized laser 30 that is used to illuminate the sand-covered surface above the buried object. Further, an imager may be used that enables the DOLP to be measured at time $T_1$. In one particular embodiment, the image sensor of PCD detector 18 is a polarimetric sensor or polarimeter. The polarimetric sensor measures the polarization of the return signal 32 in multiple directions and then this process is repeated at the second subsequent time $T_2$. Then, the system determines the ΔDOLP between $T_1$ and $T_2$. Any place in the combined/merged images from PCD detector 18 where there is an anomalously high change in the DOLP statistic identifies the location of the buried object. It should be noted that while the polarized laser has been explained in this example, it is to be entirely understood and within the scope of the present disclosure that any polarized light source could be utilized to illuminate the sand-covered surface or soil surface covering the buried object. For example, a white light source could be utilized with a polarization filter in front of its optics or as part of its optics. However, it is contemplated that the strongest signal to noise ratio (SNR) would be accomplished via a monochromatic polarized laser beam.

In another embodiment, the polarimetric sensor measures the polarization of the return signal 32 in multiple directions and then this process is repeated at each subsequent time $T_N$ within the time series. Then, the system determines the ΔDOLP between time $T_1$ and each of subsequent times $T_N$. Where each pixel has a correlation coefficient $\rho_T$ and/or $\rho_B$ that is below the threshold $\rho_{Threshold}$ the time $T_N$ that particular image was taken can be marked as the decorrelation time $T_{DC}$ of that particular pixel. As a decorrelation time $T_{DC}$ is determined for each pixel, a decorrelation image may be produced (such as in FIGS. 6A-6C).

In operation and with reference to FIGS. 2B and 2C, the PCD detector 18 captures images at the first time $T_1$ and the second time $T_2$ are collected simultaneously with the LIS images, namely, a first LIS image and a fourth LIS image (assuming a four-shot phase resolved LIS system). As can be determined from FIG. 2B, this exemplary detection assembly 50 employs an acoustic modulator 56 to induce vibration in a buried object 16 and uses shearographic sensing and PCD sensing to detect the resulting surface deformation. However, other sources may be utilized that induce vibration of the surface above the buried object. In one particular embodiment, the combined detection assembly 50 identified in FIG. 2B may be utilized to processes an LIS image and a corresponding PCD image for every shot pair. Then, the detection algorithm looks to supplement one with the other, even though they may be processed together. The detection algorithm or processes implemented by assembly 50 may further determine how to weight the LIS image against the PCD image. For example, if there is a very high SNR in the PCD detector 18 and there is a low SNR in the LIS receiver, then the detection process or algorithm may hypothesize that there may be a large amplitude target beneath the surface. In another exemplary embodiment, the results of the combined LIS and PCD processing may be utilized to queue a secondary observation to determine whether the object 16 is present. Then, the detection assembly 50 can return with the LIS receiver operating with altered settings to improve the LIS detection.

In accordance with one aspect of the present disclosure, there are several possible applications of PCD detector 18 wherein detecting small changes to sand or soil-covered surface is useful. Some of these exemplary applications include an enhanced buried object detection system, when the system of the present disclosure is used in combination with a laser interferometric sensor shearography system. Another potential application utilizes small object tracking or surface disturbance detection. Some exemplary advantages using the PCD to enhance the capabilities of LIS shearography buried mine and improvised explosive device (IED) detection systems include that LIS systems are very sensitive to small surface changes, but typically have difficulty in measuring changes larger than few times the laser illumination wavelength. The PCD system of the present disclosure may measure changes much larger than the laser illumination wavelength. When the PCD system of the present disclosure is used in combination with a LIS shearography system, the combined assembly extends the dynamic range of the entire system. In one particular embodiment, the PCD system of the present disclosure may utilize existing illumination sources that are present in conventional LIS shearography systems.

According to another aspect, the PCD detector 18 may be used as described above to locate buried objects, such as object 16, by collecting images at the first time $T_1$ and second time $T_2$, with or without the assistance of the LIS system. Then the PCD detector 18, by way of processor 22, storage medium 24, and the instructions encoded thereon, may take a subsequent series of images at times $T_N$, as described herein, to further evaluate the buried object, such as object 16, for properties including composition, depth, shape, movement, density, or the like. Alternatively, PCD detector 18 may be operated to take a series of images at times $T_1$ through $T_N$, but may only perform additional processing and analysis on the image series when a change in DOLP is determined between the first image at time $T_1$ and the second image at time $T_2$. If a change in DOLP is not detected, the remaining images taken at subsequent times $T_N$ may be disregarded and/or disposed of.

Thus, the present disclosure can be considered an add-on or additional kit or retrofit kit that may be applied to a legacy LIS shearography system to increase the dynamic range of the LIS shearography system. The dynamic range is increased by enabling detection of a change in the polarization of the surface material after being illuminated or otherwise disturbed to result in a change greater than multiple wavelengths of the illumination source. In one exemplary aspect, the metrics of how much the surface has been changed may not be provided to the system, but rather the system can detect that a change has occurred. Analysis of the signal strength details in the LIS and PCD channels may be used to estimate the magnitude of the surface change. Thus, this effectively enhances the surface heights estimation capability of a combined system having the PCD detector 18 of the present disclosure and an LIS system 52. Another exemplary non-limiting advantage is that both PCD and PDTI may be performed utilizing the same system, allowing for flexibility and speed to be optimized as a user may selectively choose between PCD and PDTI detection operations, as dictated by the desired objective. For example the inclusion and use of the PDTI processing and analysis of the image series can provide greater detail and resolution to the object detection over LIS systems alone, with a slight tradeoff of additional time needed to capture and process a series of images. This more thorough evaluation can provide details regarding the buried object which may allow for more informed and directed responses to be undertaken.

Some additional exemplary advantages utilized by the PCD detector 18 of the present disclosure may enable the shape of the PCD signal above a moving buried object to represent a direct outline of that object. Thus, the resultant outline has different characteristics than the shape of an LIS shearogram image. Thus, using both the PCD sensor of the present disclosure and LIS imagery improves the entire system's ability to classify observed detection. Another exemplary non-limiting advantage of the present disclosure is that a system that uses both a PCD sensor and LIS data will have improved Probability of Detection (PD) and decreased Probability of False Alarm (PFA) relative to a system using LIS alone. Further, another advantage is that size, weight and power of the overall system is not greatly increased as both the PCD detector 18 and the LIS system use the same laser transmitter and acoustic excitation sources. Similarly, PDTI systems may utilize the same PCD detector 18 and components which also does not increase the size, weight, and/or power of the overall system 10.

In operation and with reference to FIGS. 5A-5C, system 10 maps the $\Delta DOLP^2$ and in a region 66 where the surface 14 changed, the system will determine whether there is an anomalously large $\Delta DOLP^2$. Regions that are unchanged (background region 68) exhibit a high degree of correlation in the distribution of the DOLP statistic between times $T_1$ and $T_2$, whereas regions that are changed (target region 70) exhibit a low degree of correlation (high degree of decorrelation) of the DOLP statistic over the same time interval. As shown in Equation 11 the SNR of the signal increases with increasing background correlation ($\rho_B$) and decreasing target correlation ($\rho_T$). Even if no specific changes are induced, the background correlation tends to decrease as the time interval ($\Delta T$) increases, due to, among other causes, sensor noise and environment effects. Thus, background consideration favor operating with a small $\Delta T$ in order to increase SNR. Statistics over the target region however, can remain correlated if $\Delta T$ is chosen so small that surface changes do not fully develop, thereby reducing SNR. Thus, $\Delta T$ should be equal to a time scale in which the ground surface changes, but no longer. For a system where an acoustic agitator is utilized, $\Delta T$ should therefore be set approximately equal to the period of the sound wave in order to optimize SNR. This may be accomplished via a timer or timing logic, which may be part of processor 22, to measure a change in time ($\Delta T$) from $T_1$ to $T_2$, wherein $\Delta T$ approximate one period of the acoustic wave. FIG. 5C represents the background region as being a white area in which surface 14 has not changed resulting a highly correlated polarization statistic (DOLP) over $\Delta T$ and a target central region 70 that is shaded in which surface 14 has changed resulting a highly uncorrelated polarization statistic over $\Delta T$.

The processor 22 may generate a signal in response to the mean $\Delta DOLP^2$ to alert the presence of the object below the surface. In one exemplary embodiment, the processor generates the signal when the $\Delta DOLP^2$ exceeds a threshold level so as to be considered an anomaly or "anomalously high." In one example, an anomalously high $\Delta DOLP^2$ may be a change of X % or more relative to some running average value as determined by the needs of the system. Thus, in one non-limiting and extremely basic example, if the running average $\Delta DOLP^2$ equaled 1 and the current $\Delta DOLP^2$ equaled 3 (change in $\Delta DOLP^2=3/1=300\%$), then this may generate a signal indicating an anomaly and alert an operator of the likelihood of the object 16 below surface 14.

In another example, the threshold level for an anomalously high $\Delta DOLP^2$ refers to a sensitivity setting that an operator sets on the detection system 10. System 10 enables an operator to adjust the threshold level of an anomalously high $\Delta DOLP^2$ depending on what objects 16 the system 10 is trying to detect and how many false alarms the system 10 is willing to tolerate. In general, system 10 would apply standard image processing techniques to identify a region of high SNR within a $\Delta DOLP^2$ image. A general approach is as follows (assume that the total image is much larger than the expected target size). First, apply a spatial smoothing filter over the $\Delta DOLP^2$ image where the filter kernel size K is approximately equal to the expected target size, thereby filtering for features of the expected target size. Then rescale the image to standard deviation units above the mean (sometimes referred to as an "anomaly detector image" A). This is accomplished as follows: if F is the filtered $\Delta DOLP^2$ image, and $\mu F$ and $\sigma F$ are the mean and standard deviation of F respectively, then the anomaly image A is $A=abs[(F-\mu F)/\sigma F]$. Then, set a Threshold (Th) and declare any region of sufficient size where the average value of A>Th a target region 70. The lower the threshold Th, the lower the threshold for detection. For example, after smoothing with a 13-pixel×13-pixel filter kernel and conversion to an anomaly image A, the mean of the target region 88 in the third test simulation (FIG. 17A) is 5.9. This indicates that that the processed target region is 5.9 standard deviations above the background, and could be detected with a threshold setting of Th≤5.9.

With reference to FIGS. 6A-6C, when system 10 is utilized for PDTI detection, system 10 will map the decorrelation times $T_{DC}$ of each pixel in the imager field of view relative to a perfectly correlated image taken at time T1. In this instance, the time interval $\Delta T$ may be extended to be a time scale that may allow a target region, such as region 70, to decorrelate below the threshold $\rho_{Threshold}$ but should be limited in length as to not extend beyond the point where the background 100 also decorrelates below the same threshold $\rho_{Threshold}$.

In these instances, the processor 22 may generate a signal when each pixel drops below the preset threshold $\rho_{Threshold}$, as discussed above, and may consider that particular pixel as decorrelated relative to the baseline image (i.e. the image taken at time $T_1$). As each pixel decorrelates, the processor 22 may generate the pixel map, similar to the one shown in FIG. 6B, which may represent the outline of the buried object 16, as well as provide additional information relating to the size, shape, depth, composition, density, movement, or the like of the object 16.

While the system 10 described herein has been discussed as being useful for detecting objects buried beneath sand, it is to be understood that other surface substrates could be utilized so long as the substrate material has some random polarization. For example, soil may work as long as there are multiple random scatterings of polarization for the reflected light beam 32. However, soil or other dirt may have a lower SNR than sand even though it could still be possible to utilize the same. For example other surfaces that can be utilized in accordance with the present disclosure include human skin. For example, human skin is known to depolarize light in a random fashion. Thus, the system of the present disclosure could be utilized to assist in the detection of an object beneath the surface of human skin.

FIG. 19 depicts an exemplary subsurface object detection method of the present disclosure generally at 1900. Method 1900 may relate to detecting object(s) 16 below the surface 14. In one exemplary aspect, method 1900 may include illuminating a surface with polarized electromagnetic waves, which is shown generally at 1902. Method 1900 may further include capturing, with the polarization change detection (PCD) detector 18, a first image of the surface 14 at a first time ($T_1$), which is shown generally at 1904. Method 1900 may further include determining a DOLP for the first image from polarized reflected light 32 from the surface 14, which is shown generally at 1906. Method 1900 may further include capturing, with the PCD detector 18, a second image at a second time ($T_2$), which is shown generally at 1908. Method 1900 may further include determining the DOLP of the second image for the second image from polarized reflected light from the surface, which is shown generally at 1910. Method 1900 may further include determining, by a processor, a change in DOLP ($\Delta DOLP$ or $\Delta DOLP^2$) from the first image to the second image, which is shown generally at 1912. Method 1900 may further include comparing, by a processor, regions in the second image that have a $\Delta DOLP$ that exceeds a threshold, which is shown generally at 1914. Method 1900 may further include generating, by a processor, signal in response to the $\Delta DOLP$ (or $\Delta DOLP^2$) that exceeds the threshold to alert the presence of an object below the surface, which is shown generally at 1916. Furthermore, while portions of method 1900 are accomplished "by a processor" it is to be understood that these steps may be performed by a single processor, such as processor 22, or these may be performed separately or independently by multiple processors, of which processor 22 may or may not be one of the multiple processors.

FIG. 20 depicts an exemplary subsurface object detection method of the present disclosure generally at 2000. Method 2000 may relate to detecting object(s) 16 below the surface 14. In one exemplary aspect, method 2000 may include illuminating a surface 14 with polarized electromagnetic waves, which is shown generally at 2002. Method 2000 may further include capturing, with the polarization change detection (PCD) detector 18, a first image of the surface 14 at a first time ($T_1$), which is shown generally at 2004. Method 2000 may further include a degree of linear polarization (DOLP) for each pixel within a field of view of the PCD detector 18 in the first image from polarized reflected light from the surface 14, which is shown generally at 2006. Method 2000 may further include capturing, with the PCD detector 18, a series of images taken at subsequent times ($T_N$), which is shown generally at 2008. Method 2000 may further include determining for each pixel within the field of view of the PCD detector 18 in each of the series of subsequent images from polarized reflected light from the surface 14, which is shown generally at 2010. Method 2000 may further include comparing, by a processor, pixels in the subsequent images taken at each of times ($T_N$) to the first image of the surface 14 taken at time ($T_1$), which is shown generally at 2012. Method 2000 may further include, determining, by a processor, the time at which each pixel decorrelates below a predetermined threshold ($\rho_{Threshold}$) relative to the first image of the surface 14 taken at time ($T_1$), which is shown generally at 2014. Method 2000 may further include generating, by a processor, a pixel map and polarization decorrelation time imaging (PDTI) image, which is shown generally at 2016. Furthermore, while portions of method 2000 are accomplished "by a processor" it is to be understood that these steps may be performed by a single processor, such as processor 22, or these may be performed separately or independently by multiple processor s, of which processor 22 may or may not be one of the multiple processors.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A system for detecting an object below a surface, the system comprising:
   a polarization change detection (PCD) detector that captures a first image of the surface at a first time ($T_1$) and a plurality of subsequent images of the surface at a plurality of subsequent second times ($T_N$); and
   a processor in operative communication with the PCD detector to determine a degree of linear polarization (DOLP) of the first image at $T_1$ and a DOLP of each of the subsequent images at times $T_N$, wherein the surface changes continuously from $T_1$ to each subsequent time $T_N$ and the processor determines a statistic associated with the DOLP relative to a particular time each image of the plurality of subsequent images was taken.

2. The system of claim 1, wherein the PCD detector comprises:
   logic operative to convert different circular or elliptical polarization states into linear polarization states distinguishable by DOLP.

3. The system of claim 1, wherein the PCD detector comprises:
an imager having a first portion further defining a co-polarization channel and a second portion further defining a cross-polarization channel.

4. The system of claim 3 wherein the first portion and second portion of the imager are contained within a single unit.

5. The system of claim 1 further comprising:
wherein the statistic associated with the DOLP is a correlation coefficient for each pixel from a plurality of pixels within the imager; and
wherein the processor assigns a decorrelation time ($T_{DC}$) for each pixel from the plurality of pixels within the imager corresponding to the specific time the correlation coefficient is equal to or less than a predetermined threshold.

6. The system of claim 5 further comprising:
wherein the processor generates a polarization decorrelation time imaging (PDTI) image and a pixel map from the assigned $T_{DC}$ of each pixel from the plurality of pixels within the imager.

7. The system of claim 1, further comprising
a polarized light source coupled with the PCD detector to illuminate the surface with polarized electromagnetic radiation.

8. The system of claim 7, wherein the polarized light source comprises:
a laser transmitter generating a polarized laser beam directed at the surface, wherein the first image and the subsequent images capture a reflected beam from the surface.

9. The system of claim 1, further comprising:
a laser interferometric sensor (LIS) system comprising a laser transmitter coupled with the PCD detector.

10. The system of claim 9, wherein the laser transmitter is part of the LIS system and generates a polarized laser beam.

11. The system of claim 7, further comprising:
a platform carrying the LIS system and the PCD detector.

12. The system of claim 1, further comprising:
an acoustic modulator generating an acoustic wave to agitate the subsurface object.

13. A subsurface object detection method comprising:
illuminating a surface with polarized electromagnetic waves;
capturing, with a polarization change detection (PCD) detector, a first image of the surface at a first time ($T_1$);
determining a degree of linear polarization (DOLP) for each pixel within a field of view of the PCD detector in the first image from polarized reflected light from the surface;
capturing, with the PCD detector, a series of images taken at subsequent times ($T_N$);
determining the DOLP for each pixel within the field of view of the PCD detector in each of the series of subsequent images from polarized reflected light from the surface;
comparing, by the processor, each pixel in each of the subsequent images taken at each of times ($T_N$) to the same pixel in the first image of the surface taken at time ($T_1$);
determining, by the processor, the time at which each pixel decorrelates below a predetermined threshold ($\rho_{Threshold}$) relative to the first image of the surface 14 taken at time ($T_1$); and
generating, by the processor, a pixel map and polarization decorrelation time imaging (PDTI) image.

14. The subsurface object detection method of claim 13 further comprising:
converting different circular or elliptical polarization states into linear polarization states distinguishable by DOLP.

15. The subsurface object detection method of claim 13 further comprising:
changing the surface continuously between $T_1$ and $T_N$, wherein the DOLP of each pixel is responsive to changing the surface between $T_1$ and $T_N$.

16. The subsurface object detection method of claim 15 further comprising:
determining at least one of a size, shape, depth, and composition of an object buried under the surface from the pixel map and PDTI image.

17. The subsurface object detection method of claim 15 further comprising:
modulating an acoustic modulator to direct sound waves towards the surface simultaneous to illuminating the surface with polarized electromagnetic waves.

18. The subsurface object detection method of claim 13 wherein determining the time at which each pixel decorrelates below $\rho_{Threshold}$ further comprises:
determining, by the processor, the change in DOLP ($\Delta DOLP$) for each pixel in each of the images taken at each subsequent time relative to the same pixel in the image taken at time $T_1$;
calculating a correlation coefficient for each pixel in each of the images taken at each subsequent time relative to the same pixel in the image taken at time $T_1$; and
comparing the correlation coefficient to the $\rho_{Threshold}$.

19. The subsurface object detection method of claim 13 wherein capturing, with the PCD detector, a series of images taken at subsequent times ($T_N$) further comprises:
capturing a series of images at a preset interval for a predetermined time period.

20. The subsurface object detection method of claim 13 wherein capturing, with the PCD detector, a series of images taken at subsequent times ($T_N$) further comprises:
capturing a first portion of the series of images at a first interval during a first time period; and
capturing a second portion of the series of images at a second interval during a second time period.

* * * * *